United States Patent
Matsuda et al.

(10) Patent No.: US 10,700,812 B2
(45) Date of Patent: Jun. 30, 2020

(54) DEVICE, METHOD, AND PROGRAM

(71) Applicant: SONY CORPORATION, Tokyo (JP)

(72) Inventors: Hiroki Matsuda, Tokyo (JP); Ryota Kimura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 259 days.

(21) Appl. No.: 15/571,565

(22) PCT Filed: Mar. 30, 2016

(86) PCT No.: PCT/JP2016/060547
§ 371 (c)(1),
(2) Date: Nov. 3, 2017

(87) PCT Pub. No.: WO2016/181718
PCT Pub. Date: Nov. 17, 2016

(65) Prior Publication Data
US 2018/0160403 A1 Jun. 7, 2018

(30) Foreign Application Priority Data

May 14, 2015 (JP) .................................. 2015-098899
Aug. 5, 2015 (JP) .................................. 2015-155121

(51) Int. Cl.
*H04W 72/04* (2009.01)
*H04L 1/00* (2006.01)
(Continued)

(52) U.S. Cl.
CPC .......... *H04L 1/0071* (2013.01); *H04J 11/005* (2013.01); *H04J 11/0043* (2013.01);
(Continued)

(58) Field of Classification Search
CPC ........... H04W 72/042; H04W 72/0473; H04W 72/082; H04W 52/346; H04W 52/146; H04W 52/38
See application file for complete search history.

(56) References Cited

U.S. PATENT DOCUMENTS

2003/0039306 A1   2/2003   Redfern
2015/0171983 A1   6/2015   Kusashima
(Continued)

FOREIGN PATENT DOCUMENTS

CN   104321990 A   1/2015
CN   107431554 A   12/2017
(Continued)

OTHER PUBLICATIONS

Written Opinion dated May 31, 2018 in Singaporean Patent Application No. 11201708833P, 5 pages.
(Continued)

*Primary Examiner* — Anh Vu H Ly
*Assistant Examiner* — Hector Reyes
(74) *Attorney, Agent, or Firm* — Xsensus LLP

(57) ABSTRACT

A device, method, and program that can improve decoding precision of a desired signal in a case in which multiplexing/multiple access is performed using power allocation. The device includes a transmission processor configured to set each of transmission signal sequences of a plurality of power layers that are to be multiplexed using power allocation as a target and apply at least one of a scrambler using a scramble pattern and an interleaver using an interleave pattern corresponding to information regarding the power allocation.

19 Claims, 23 Drawing Sheets

(51) Int. Cl.
*H04J 11/00* (2006.01)
*H04L 5/00* (2006.01)
*H04W 72/08* (2009.01)

(52) U.S. Cl.
CPC ....... *H04L 5/0057* (2013.01); *H04W 72/0473* (2013.01); *H04W 72/082* (2013.01)

(56) References Cited

U.S. PATENT DOCUMENTS

| | | | |
|---|---|---|---|
| 2015/0349866 A1* | 12/2015 | Benjebbour | H04L 5/00 370/329 |
| 2016/0100413 A1* | 4/2016 | Hwang | H04B 7/0452 370/330 |
| 2017/0223725 A1* | 8/2017 | Xiong | H04L 5/0053 |
| 2018/0159643 A1* | 6/2018 | Huang | H04B 17/345 |

FOREIGN PATENT DOCUMENTS

| | | |
|---|---|---|
| EP | 2 953 281 A1 | 12/2015 |
| JP | 2003-78419 A | 3/2003 |
| JP | 2003-229835 A | 8/2003 |
| JP | 2013-247513 A | 12/2013 |

OTHER PUBLICATIONS

Office Action and Search Report issued in Chinese Application 201680026432.7 dated Nov. 11, 2018.
Extended Search Report issued in European Application 16792443.0-1220 dated Dec. 20, 2018.
Shinichi Nomoto, "State-of-the-art Transmission Schemes and Future Trends in Mobile and Wireless Communications," Proceeding of the 2010 IEICE General Conference Electronics 1, Mar. 2, 2010, (with English translation), (9 pages).
International Search Report dated May 31, 2016 in PCT/JP2016/060547 filed Mar. 30, 2016.

* cited by examiner

DEVICE, METHOD, AND PROGRAM

TECHNICAL FIELD

The present invention relates to a device, a method, and a program.

BACKGROUND ART

Non-orthogonal multiple access (NOMA) has been attracting attention as a radio access technology (RAT) for a fifth generation (5G) mobile communication system following Long Term Evolution (LTE)/LTE-Advanced (LTE-A). In orthogonal frequency-division multiple access (OFDMA) and single-carrier frequency-division multiple access (SC-FDMA), which are adopted in LTE, radio resources (e.g., resource blocks) are allocated to users without overlap. These schemes are called orthogonal multiple access. In contrast, in non-orthogonal multiple access, radio resources are allocated to users with overlap. In non-orthogonal multiple access, signals of users interfere with each other, but a signal for each user is taken out by a high-accuracy decoding process at the reception side. Non-orthogonal multiple access, in theory, achieves higher cell communication capability than orthogonal multiple access.

One of radio access technologies classified into non-orthogonal multiple access is superposition coding (SPC) multiplexing/multiple access. SPC is a scheme in which signals to which different levels of power are allocated are multiplexed on at least partly overlapping radio resources in frequency and time. At the reception side, interference cancellation and/or iterative detection is performed for reception/decoding of signals multiplexed on the same radio resource.

For example, PTLs 1 and 2 disclose, as SPC or a technology equivalent to SPC, techniques for setting an amplitude (or power) that allows appropriate demodulation/decoding. Moreover, for example, PTL 3 discloses a technique for enhancing successive interference cancellation (SIC) for reception of multiplexed signals.

CITATION LIST

Patent Literature

Patent Literature 1: JP 2003-78419A
Patent Literature 2: JP 2003-229835A
Patent Literature 3: JP 2013-247513A

DISCLOSURE OF INVENTION

Technical Problem

In signal processing technologies using SPC, it is necessary to improve decoding precision of multiplexed signals of multiple power layers (interference signals and desired signals). Accordingly, the present disclosure proposes a novel and improved device, a novel and improved method, and a novel and improved program capable of further improving decoding precision of a desired signal in a case in which multiplexing/multiple access is performed using power allocation.

Solution to Problem

According to the present disclosure, there is provided a device including: a transmission processing unit configured to set each of transmission signal sequences of a plurality of power layers that are to be multiplexed using power allocation as a target and apply at least one of a scrambler using a scramble pattern and an interleaver using an interleave pattern corresponding to information regarding the power allocation.

In addition, according to the present disclosure, there is provided a device including: an acquisition unit configured to acquire information regarding power allocation of a plurality of power layers that are to be multiplexed using power allocation; and a reception processing unit configured to perform interference cancellation using at least one of a descrambler using a scramble pattern and a deinterleaver using an interleave pattern corresponding to the information regarding the power allocation acquired by the acquisition unit.

In addition, according to the present disclosure, there is provided a method including: setting each of transmission signal sequences of a plurality of power layers that are to be multiplexed using power allocation as a target, and applying at least one of a scrambler using a scramble pattern and an interleaver using an interleave pattern corresponding to information regarding the power allocation, by a processor.

In addition, according to the present disclosure, there is provided a method including: acquiring information regarding power allocation of a plurality of power layers that are to be multiplexed using power allocation; and performing, by a processor, interference cancellation using at least one of a descrambler using a scramble pattern and a deinterleaver using an interleave pattern corresponding to the acquired information regarding the power allocation.

In addition, according to the present disclosure, there is provided a program causing a computer to function as: a transmission processing unit configured to set each of transmission signal sequences of a plurality of power layers that are to be multiplexed using power allocation as a target and apply at least one of a scrambler using a scramble pattern and an interleaver using an interleave pattern corresponding to information regarding the power allocation.

In addition, according to the present disclosure, there is provided a program causing a computer to function as: an acquisition unit configured to acquire information regarding power allocation of a plurality of power layers that are to be multiplexed using power allocation; and a reception processing unit configured to perform interference cancellation using at least one of a descrambler using a scramble pattern and a deinterleaver using an interleave pattern corresponding to the information regarding the power allocation acquired by the acquisition unit.

Advantageous Effects of Invention

As described above, according to the present disclosure, it is possible to further improve decoding precision of a desired signal in a case in which multiplexing/multiple access is performed using power allocation. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
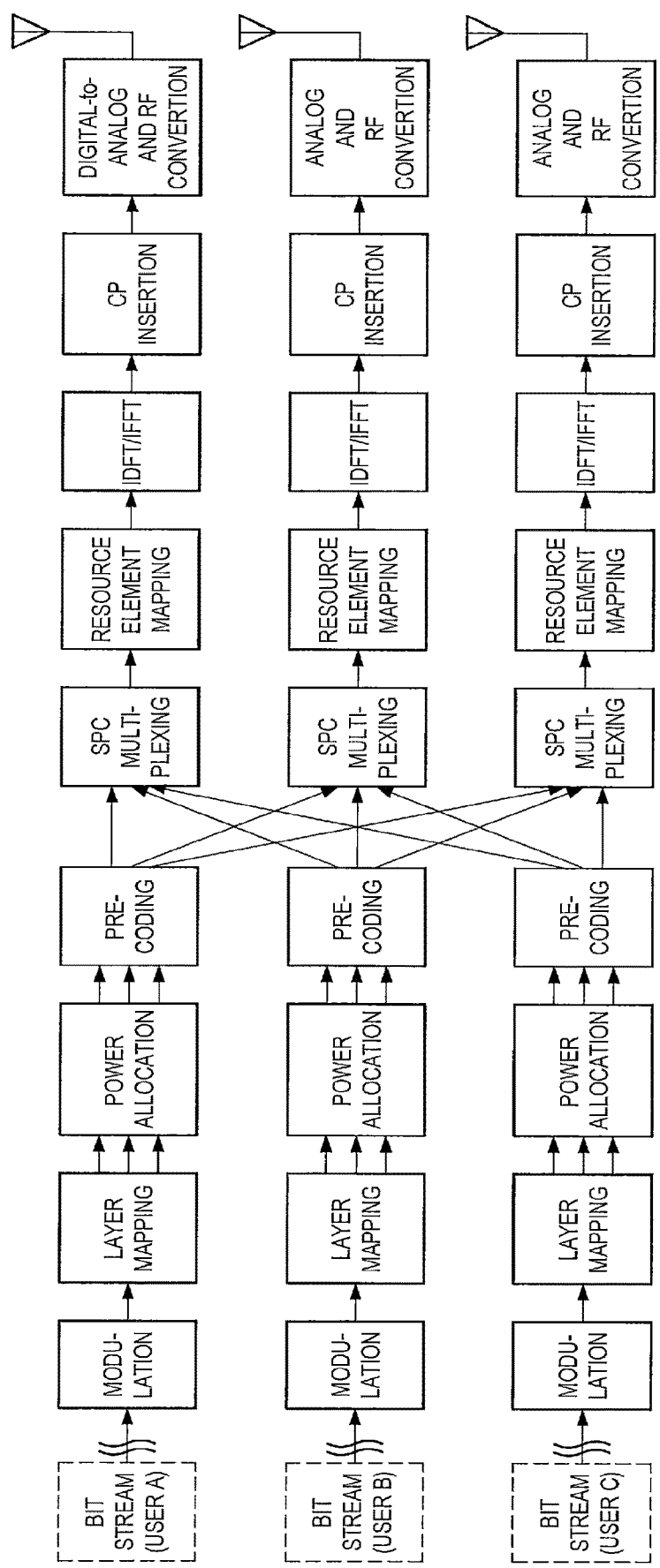
FIG. 1 is an explanatory diagram for explaining an example of a process in a transmission device that supports SPC.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Furthermore, in this specification and the appended drawings, elements having substantially the same functional configuration may be discriminated by putting different letters after the same reference numeral. For example, elements having substantially the same functional configuration are discriminated as terminal devices 200A, 200B and 200C as necessary. However, when it is unnecessary to specially discriminate between multiple elements having substantially the same functional configuration, only the same reference numeral is attached thereto. For example, when it is unnecessary to specially discriminate between the terminal devices 200A, 200B, and 200C, the terminal devices are simply called a terminal device 200.

Note that description will be provided in the following order.
1. SPC
2. Technical problem
3. Schematic configuration of communication system
4. Configuration of each device
4.1. Configuration of base station
4.2. Configuration of terminal device
5. First embodiment
5.1. Technical features
5.2. Process flow
6. Second embodiment
6.1. MBMS
6.2. Technical features
7. Modified example
8. Application
9. Conclusion

1. SPC

Figure 2:
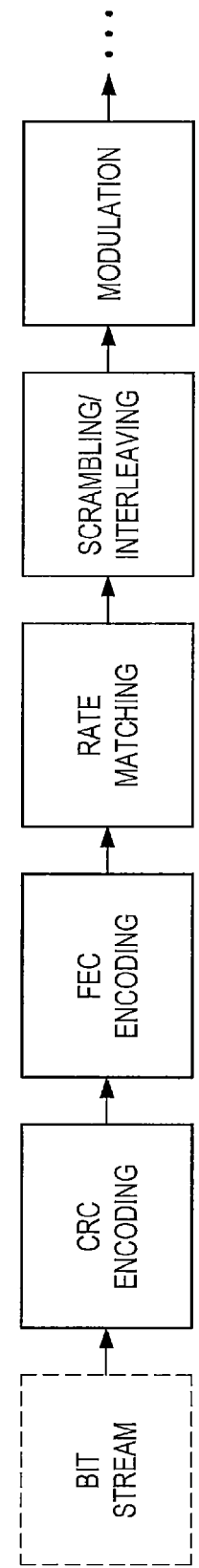
FIG. 2 is an explanatory diagram for explaining an example of a process in a transmission device that supports SPC.
Figure 3:
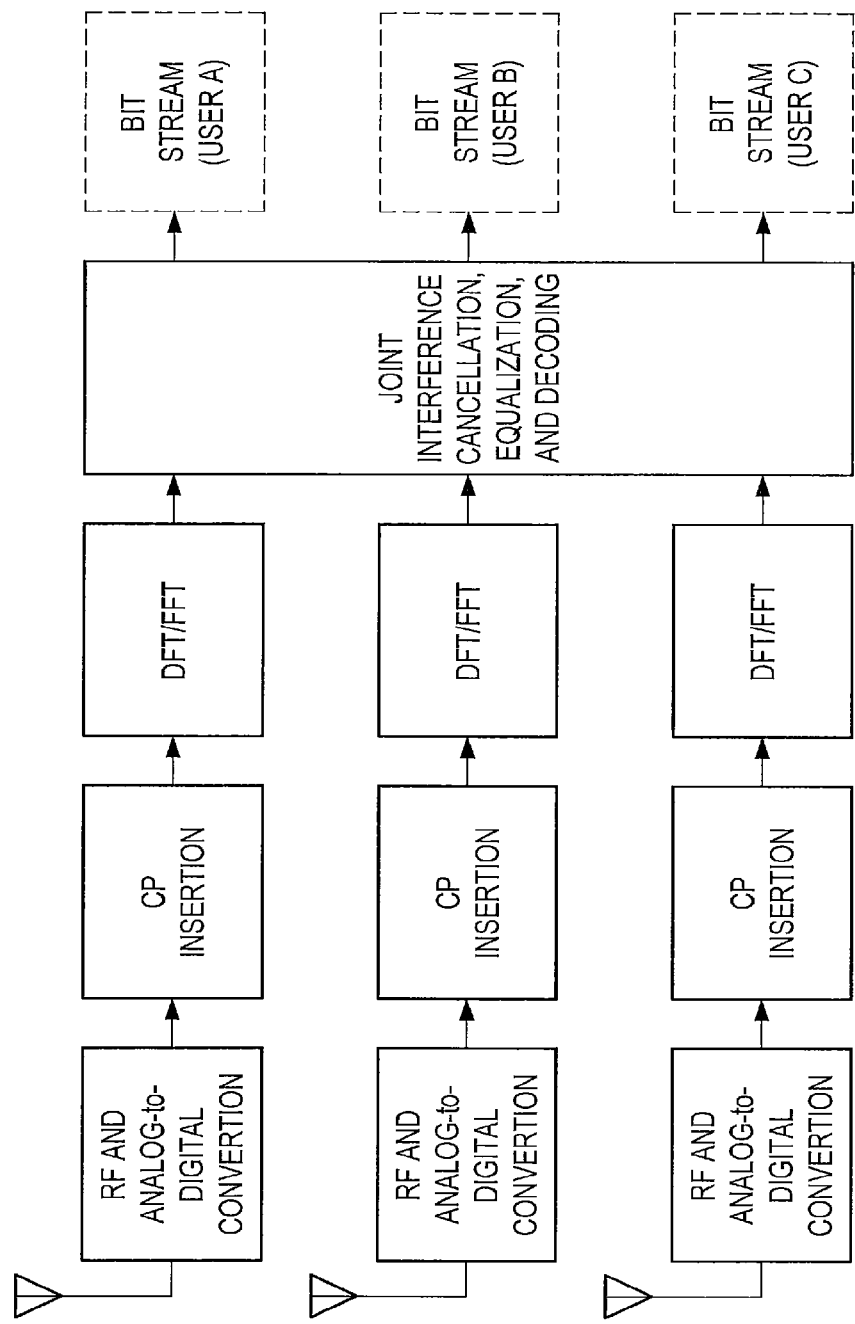
FIG. 3 is an explanatory diagram for explaining an example of a process in a reception device that performs interference cancellation.

Firstly described with reference to FIGS. 1 to 3 are processes and signals of SPC.

(1) Process in Each Device (a) Process in Transmission Device

FIGS. 1 and 2 are explanatory diagrams for explaining an example of a process in a transmission device that supports SPC. According to FIG. 1, for example, bit streams (e.g., transport blocks) of a user A, a user B, and a user C are processed. For each of these bit streams, some processes (e.g., cyclic redundancy check (CRC) encoding, forward error correction (FEC) encoding, rate matching, and scrambling/interleaving, as illustrated in FIG. 2) are performed and then modulation is performed. Further, layer mapping, power allocation, precoding, SPC multiplexing, resource element mapping, inverse discrete Fourier transform (IDFT)/inverse fast Fourier transform (IFFT), cyclic prefix (CP) insertion, digital-to-analog and radio frequency (RF) conversion, and the like are performed.

In particular, in power allocation, power is allocated to signals of the user A, the user B, and the user C, and in SPC multiplexing, the signals of the user A, the user B, and the user C are multiplexed.

(b) Process in Reception Device

FIG. 3 is an explanatory diagram for explaining an example of a process in a reception device that performs interference cancellation. According to FIG. 4, for example, RF and analog-to-digital conversion, CP removal, discrete Fourier transform (DFT)/fast Fourier transform (FFT), joint interference cancellation, equalization, decoding, and the like are performed. This provides bit streams (e.g., transport blocks) of the user A, the user B, and the user C.

(2) Transmission Signals and Reception Signals (a) Downlink

Next, downlink transmission signals and reception signals when SPC is adopted will be described. Assumed here is a multi-cell system of heterogeneous network (HetNet), small cell enhancement (SCE), or the like.

An index of a cell to be in connection with a target user u is denoted by i, and the number of transmission antennas of a base station corresponding to the cell is denoted by $N_{TX,i}$. Each of the transmission antennas may also be called a transmission antenna port. A transmission signal from the cell i to the user u can be expressed in a vector form as below.

$$s_{i,u} = \begin{bmatrix} s_{i,u,0} \\ \vdots \\ s_{i,u,N_{TX,i}-1} \end{bmatrix} = W_{i,u} P_{i,u} x_{i,u} \qquad \text{[Math. 1]}$$

$$W_{i,u} = \begin{bmatrix} w_{i,u,0,0} & \cdots & w_{i,u,0,N_{SS,u}-1} \\ \vdots & \ddots & \vdots \\ w_{i,u,N_{TX,i}-1,0} & \cdots & w_{i,u,N_{TX,i}-1,N_{SS,u}-1} \end{bmatrix} \qquad \text{[Math. 2]}$$

$$P_{i,u} = \begin{bmatrix} P_{i,u,0,0} & \cdots & P_{i,u,0,N_{SS,u}-1} \\ \vdots & \ddots & \vdots \\ P_{i,u,N_{SS,u}-1,0} & \cdots & P_{i,u,N_{SS,u}-1,N_{SS,u}-1} \end{bmatrix} \qquad \text{[Math. 3]}$$

$$x_{i,u} = \begin{bmatrix} x_{i,u,0} \\ \vdots \\ x_{i,u,N_{SS,u}-1} \end{bmatrix} \qquad \text{[Math. 4]}$$

In the above expressions, $N_{SS,u}$ denotes the number of spatial transmission streams for the user u. Basically, $N_{SS,u}$ is a positive integer equal to or less than $N_{TX,i}$. A vector $x_{i,u}$ is a spatial stream signal to the user u. Elements of this vector basically correspond to digital modulation symbols of phase shift keying (PSK), quadrature amplitude modulation (QAM), or the like. A matrix $W_{i,u}$ is a precoding matrix for the user u. An element in this matrix is basically a complex number, but may be a real number.

A matrix $P_{i,u}$ is a power allocation coefficient matrix for the user u in the cell i. In this matrix, each element is preferably a positive real number. Note that this matrix may be a diagonal matrix (i.e., a matrix whose components excluding diagonal components are zero) as below.

$$P_{i,u} = \begin{bmatrix} P_{i,u,0,0} & 0 & \cdots & 0 \\ 0 & P_{i,u,1,1} & \ddots & \vdots \\ \vdots & \ddots & \ddots & 0 \\ 0 & \cdots & \cdots & P_{i,u,N_{SS,u}-1,N_{SS,u}-1} \end{bmatrix} \qquad \text{[Math. 5]}$$

If adaptive power allocation for a spatial stream is not performed, a scalar value $P_{i,u}$ may be used instead of the matrix $P_{i,u}$.

As well as the user u, another user v is present in the cell i, and a signal $s_{i,v}$ of the other user v is also transmitted on the same radio resource. These signals are multiplexed using SPC. A signal $s_i$ from the cell i after multiplexing is expressed as below.

$$s_i = \sum_{u' \in U_i} s_{i,u'} \qquad \text{[Math. 6]}$$

In the above expression, $U_i$ denotes a set of users for which multiplexing is performed in the cell i. Also in a cell j (a cell that serves as an interference source for the user u) other than a serving cell of the user u, a transmission signal $s_j$ is generated similarly. Such a signal is received as interference at the user side. A reception signal $r_u$ of the user u can be expressed as below.

$$r_u = \begin{bmatrix} r_{u,0} \\ \vdots \\ r_{u,N_{RX,u}-1} \end{bmatrix} = \sum_{i'} H_{u,i'} s_{i'} + n_u \qquad \text{[Math. 7]}$$

$$H_{u,i} = \begin{bmatrix} h_{u,i,0,0} & \cdots & h_{u,i,0,N_{TX,i}-1} \\ \vdots & \ddots & \vdots \\ h_{u,i,N_{RX,u}-1,0} & \cdots & h_{u,i,N_{RX,u}-1,N_{TX,i}-1} \end{bmatrix} \qquad \text{[Math. 8]}$$

$$n_u = \begin{bmatrix} n_{u,0} \\ \vdots \\ n_{u,N_{RX,u}-1} \end{bmatrix} \qquad \text{[Math. 9]}$$

In the above expressions, a matrix $H_{u,i}$ is a channel response matrix for the cell i and the user u. Each element of the matrix $H_{u,i}$ is basically a complex number. A vector $n_u$ is noise included in the reception signal $r_u$ of the user u. For example, the noise includes thermal noise and interference from another system. The average power of the noise is expressed as below.

$$\sigma_{n,u}^2 \qquad \text{[Math. 10]}$$

The reception signal $r_u$ can also be expressed by a desired signal and another signal as below.

$$r_u = H_{u,i} s_{i,u} + H_{u,i} \sum_{v \in U_i, v \neq u} s_{i,v} + \sum_{j \neq i} H_{u,j} \sum_{v \in U_j} s_{j,v} + n_u \qquad \text{[Math. 11]}$$

In the above expression, the first term of the right side denotes a desired signal of the user u, the second term, interference in the serving cell i of the user u (called intra-cell interference, multi-user interference, multi-access interference, or the like), and the third term, interference from a cell other than the cell i (called inter-cell interference).

When orthogonal multiple access (e.g., OFDMA or SC-FDMA) or the like is adopted, the reception signal can be expressed as below.

$$r_u = H_{u,i} s_{i,u} + \sum_{j \neq i} H_{u,j} s_{j,v} + n_u \qquad \text{[Math. 12]}$$

In orthogonal multiple access, no intra-cell interference occurs, and moreover, in the other cell j, a signal of the other user v is not multiplexed on the same radio resource.

(b) Uplink

Next, uplink transmission signals and reception signals when SPC is adopted will be described. Assumed here is a multi-cell system of HetNet, SCE, or the like. Note that the signs used for downlink will be further used as signs denoting signals and the like.

A transmission signal that the user u transmits in the cell i can be expressed in a vector form as below.

$$s_{i,u} = \begin{bmatrix} s_{i,u,0} \\ \vdots \\ s_{i,u,N_{TX,u}-1} \end{bmatrix} = W_{i,u} P_{i,u} x_{i,u}$$ [Math. 13]

$$W_{i,u} = \begin{bmatrix} w_{i,u,0,0} & \cdots & w_{i,u,0,N_{SS,u}-1} \\ \vdots & \ddots & \vdots \\ w_{i,u,N_{TX,u}-1,0} & \cdots & w_{i,u,N_{TX,u}-1,N_{SS,u}-1} \end{bmatrix}$$ [Math. 14]

$$P_{i,u} = \begin{bmatrix} P_{i,u,0,0} & \cdots & P_{i,u,0,N_{SS,u}-1} \\ \vdots & \ddots & \vdots \\ P_{i,u,N_{SS,u}-1,0} & \cdots & P_{i,u,N_{SS,u}-1,N_{SS,u}-1} \end{bmatrix}$$ [Math. 15]

$$x_{i,u} = \begin{bmatrix} x_{i,u,0} \\ \vdots \\ x_{i,u,N_{SS,u}-1} \end{bmatrix}$$ [Math. 16]

In the above expressions, the number of transmission antennas is the number of transmission antennas of the user, $N_{TX,u}$. As in downlink, a matrix $P_{i,u}$, which is a power allocation coefficient matrix for the user u in the cell i, may be a diagonal matrix.

In uplink, there is no case where a signal of a user and a signal of another user are multiplexed in the user; thus, a reception signal of a base station of the cell i can be expressed as below.

$$r_i = \begin{bmatrix} r_{i,0} \\ \vdots \\ r_{i,N_{RX,i}-1} \end{bmatrix} = \sum_{i'} \sum_{u' \in U_i'} H_{i',u'} s_{i',u'} + n_i$$ [Math. 17]

$$H_{i,u} = \begin{bmatrix} h_{i,u,0,0} & \cdots & h_{i,u,0,N_{TX,u}-1} \\ \vdots & \ddots & \vdots \\ h_{i,u,N_{RX,i}-1,0} & \cdots & h_{i,u,N_{RX,i}-1,N_{TX,u}-1} \end{bmatrix}$$ [Math. 18]

$$n_i = \begin{bmatrix} n_{i,0} \\ \vdots \\ n_{i,N_{RX,i}-1} \end{bmatrix}$$ [Math. 19]

It should be noted that in uplink, unlike in downlink, a base station needs to obtain all signals from a plurality of users in a cell by decoding. Note also that a channel response matrix differs depending on a user.

When a focus is put on a signal transmitted by the user u, among uplink signals in the cell i, a reception signal can be expressed as below.

$$r_{i,u} = \begin{bmatrix} r_{i,u,0} \\ \vdots \\ r_{i,u,N_{RX,i}-1} \end{bmatrix} =$$ [Math. 20]

$$H_{i,u} s_{i,u} + \sum_{v \in U_i, v \neq u} H_{i,v} s_{i,v} + \sum_{j \neq i} \sum_{v \in U_j} H_{i,v} s_{j,v} + n_i$$

In the above expression, the first term of the right side denotes a desired signal of the user u, the second term, interference in the serving cell i of the user u (called intra-cell interference, multi-user interference, multi-access interference, or the like), and the third term, interference from a cell other than the cell i (called inter-cell interference).

When orthogonal multiple access (e.g., OFDMA or SC-FDMA) or the like is adopted, the reception signal can be expressed as below.

$$r_{i,u} = H_{i,u} s_{i,u} + \sum_{j \neq i} H_{i,v} s_{j,v} + n_i$$ [Math. 21]

In orthogonal multiple access, no intra-cell interference occurs, and moreover, in the other cell j, a signal of the other user v is not multiplexed on the same radio resource.

2. Technical Problem

Next, a technical problem according to an embodiment of the present disclosure will be described.

SIC is an example of a technology for appropriately decoding a desired signal from signals of a plurality of power layers multiplexed using SPC. In SIC, a user decodes multiplexed signals of other users and uses decoded signals as replica signals for interference cancellation.

As an implementation example of SIC, a code word interference canceller (CW-IC) that decodes signals of other users until a transport block level is known. However, in the CW-IC, in order for a user to generate replicas of interference signals (that is, signals of other users), a scramble pattern and/or an interleave pattern used for the interference signals is preferably known.

Here, in the specification of 3GPP disclosed in "3GPP TS 36.211: 'Evolved Universal Terrestrial Radio Access (E-UTRA): Physical channels and modulation,'" as will be described below, a radio network temporary ID (RNTI) is used to generate a scramble pattern. First, scrambling of a bit sequence (that is, a transmission signal sequence) is expressed in the following expression.

$$\tilde{b}^{(q)}(i) = (b^{(q)}(i) + c^{(q)}(i)) \bmod 2$$ [Math. 22]

Here, i denotes a bit index, q denotes a codeword index, $b^{(q)}(i)$ denotes a bit sequence before scramble, and $c^{(q)}(i)$ denotes a scramble pattern. The scramble pattern $c^{(q)}(i)$ is uniquely decided using an initial value $c_{init}$ calculated in the following expression.

$$c_{init} = n_{RNTI} \cdot 2^{14} + q \cdot 2^{13} + \lfloor n_s/2 \rfloor \cdot 2^9 + N_{ID}^{cell}$$ [Math. 23]

Here, $n_{RNTI}$ denotes an RNTI, q denotes a codeword index, $n_s$ denotes a slot index, and $N^{cell}_{ID}$ denotes a cell ID.

As described above, to generate a scramble pattern, an RNTI, the codeword index, the slot index, and the cell ID are used. Accordingly, in order for the user to know a scramble pattern used in the interference signal, the information used to generate the scramble pattern can preferably be known.

Of the information, the codeword index and the slot index are information which is easily known by the user in a case in which the same codeword index and slot index are used in signals of the plurality of users. This is because the user can estimate that the same codeword index and slot index as the codeword index and the slot index used by the user are used for signals of the other users. Conversely, in a case in which different codeword indexes or slot indexes are used among the plurality of users, a structure for separately notifying of the codeword indexes or the slot indexes used in the signals of the other users is necessary.

In addition, in SPC, the cell IDs have the same value for all the users for which the multiplexing is performed since the signals of the users belonging to the same cell are multiplexed. That is, the cell IDs of the other users are information which is easily known by the user.

However, an RNTI is a different value for all the users and means for notifying the other users of the RNTI of a certain user is not prepared. That is, the RNTIs of the other users are information which is difficult for the user to know. To allow the user to know the RNTIs of the other users, for example, newly adding control information such as downlink control information (DCI) can be considered. However, when the control information is newly added, a consumption amount of radio resources (for example, a frequency and a time) may increase and an amount of signaling overhead corresponding to the added control information may occur. Accordingly, in order to suppress an addition amount or not to add the control information, it can be said that it is preferable to use another parameter instead of an RNTI.

On the other hand, using the same scramble pattern for all the users for whom multiplexing is performed or not using a scrambler at all can be considered. However, in a case in which signals to be multiplexed using SPC are not scrambled, it is known that an influence of an interference signal does not disperse and BLER features degrade. From this viewpoint, it is preferable to scramble signals of all the users for whom multiplexing is performed or signals of at least some of the users.

Accordingly, it is preferable to provide a structure in which it is easy to apply a scramble process to signals of at least some of the users for whom multiplexing is performed and it is easy for a user to know a scramble pattern used in signals of the other users.

The scramble pattern has been the focus of the above description. The same also applies to an interleave pattern.

3. Schematic Configuration of System

Figure 4:
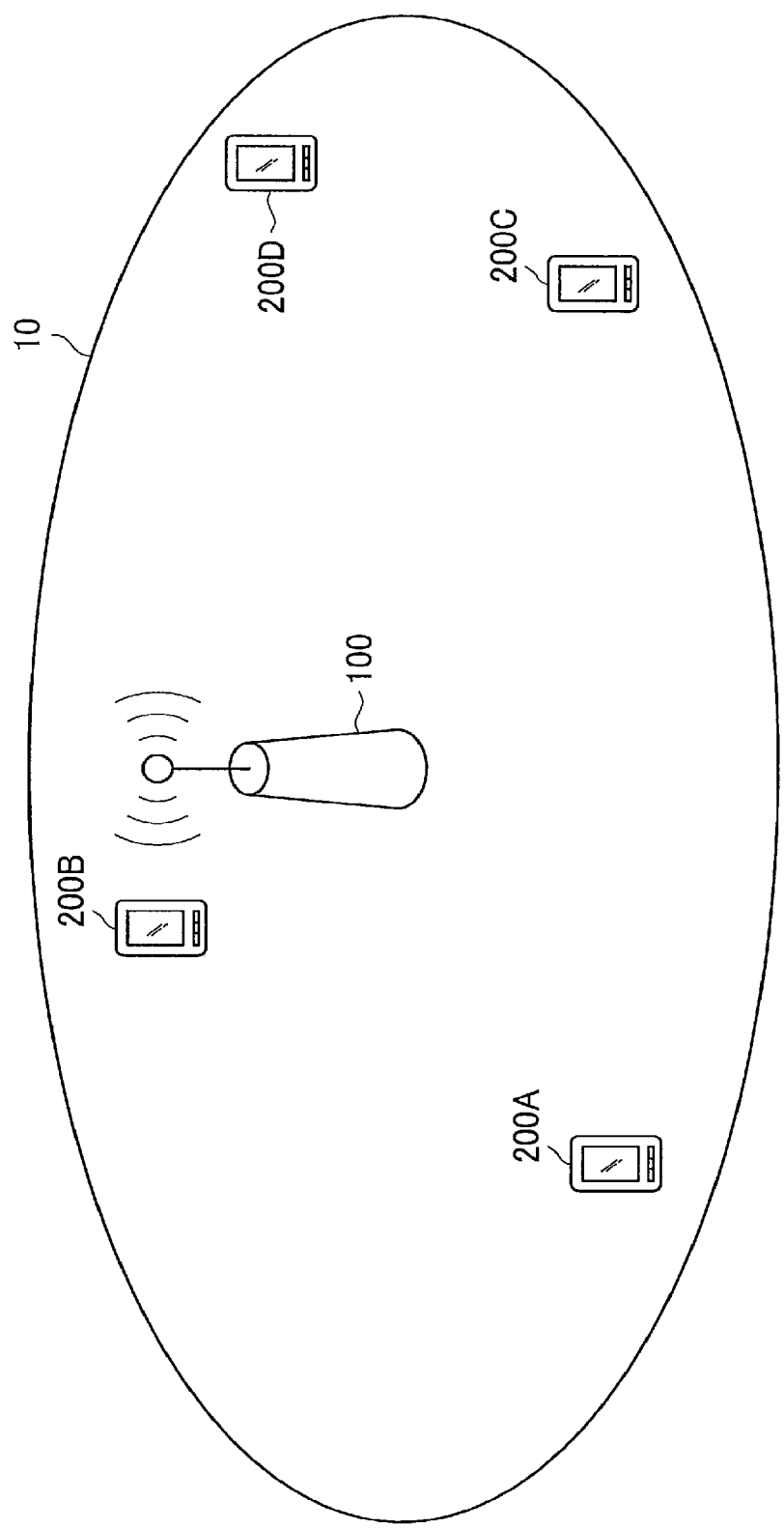
FIG. 4 is an explanatory diagram illustrating an example of a schematic configuration of a system according to an embodiment of the present disclosure.

Now, a schematic configuration of a system 1 according to an embodiment of the present disclosure will be described with reference to FIG. 4. FIG. 4 is an explanatory diagram illustrating an example of the schematic configuration of the system 1 according to an embodiment of the present disclosure. According to FIG. 4, the system 1 includes a base station 100 and a terminal device 200. Here, the terminal device 200 is also called a user. The user may also be called a user equipment (UE). Here, the UE may be a UE defined in LTE or LTE-A, or may generally refer to communication equipment.

(1) Base Station 100

The base station 100 is a base station of a cellular system (or mobile communication system). The base station 100 performs radio communication with a terminal device (e.g., the terminal device 200) located in a cell 10 of the base station 100. For example, the base station 100 transmits a downlink signal to the terminal device, and receives an uplink signal from the terminal device.

(2) Terminal Device 200

The terminal device 200 can perform communication in a cellular system (or mobile communication system). The terminal device 200 performs radio communication with a base station (e.g., the base station 100) of the cellular system. For example, the terminal device 200 receives a downlink signal from the base station, and transmits an uplink signal to the base station.

(3) Multiplexing/Multiple Access

In particular, in an embodiment of the present disclosure, the base station 100 performs radio communication with a plurality of terminal devices by non-orthogonal multiple access. More specifically, the base station 100 performs radio communication with a plurality of terminal devices by multiplexing/multiple access using power allocation. For example, the base station 100 performs radio communication with the plurality of terminal devices by multiplexing/multiple access using SPC.

For example, the base station 100 performs radio communication with the plurality of terminal devices by multiplexing/multiple access using SPC in downlink. Specifically, for example, the base station 100 multiplexes signals to the plurality of terminal devices using SPC. In this case, for example, the terminal device 200 removes one or more other data signals, as interference, from a multiplexed signal including a desired signal (that is, a signal to the terminal device 200), and decodes the desired signal.

Note that the base station 100 may perform radio communication with the plurality of terminal devices by multiplexing/multiple access using SPC in uplink, instead of or together with downlink. In this case, the base station 100 may decode a multiplexed signal including signals transmitted from the plurality of terminal devices into the signals.

4. Configuration of Each Device

Now, configurations of the base station 100 and the terminal device 200 according to an embodiment of the present disclosure will be described with reference to FIGS. 5 and 6.

<4.1. Configuration of Base Station>

First, an example of the configuration of the base station 100 according to an embodiment of the present disclosure will be described with reference to FIG. 5. FIG. 5 is a block diagram illustrating the example of the configuration of the base station 100 according to an embodiment of the present disclosure. According to FIG. 5, the base station 100 includes an antenna unit 110, a radio communication unit 120, a network communication unit 130, a storage unit 140, and a processing unit 150.

(1) Antenna Unit 110

The antenna unit 110 radiates signals output by the radio communication unit 120 out into space as radio waves. In addition, the antenna unit 110 converts radio waves in the space into signals, and outputs the signals to the radio communication unit 120.

(2) Radio Communication Unit 120

The radio communication unit 120 transmits and receives signals. For example, the radio communication unit 120 transmits a downlink signal to a terminal device, and receives an uplink signal from a terminal device.

(3) Network Communication Unit 130

The network communication unit 130 transmits and receives information. For example, the network communication unit 130 transmits information to other nodes, and receives information from other nodes. For example, the other nodes include another base station and a core network node.

(4) Storage Unit 140

The storage unit 140 temporarily or permanently stores a program and various data for operation of the base station 100.

(5) Processing Unit 150

The processing unit 150 provides various functions of the base station 100. The processing unit 150 includes a transmission processing unit 151 and a notification unit 153. Further, the processing unit 150 may further include other components in addition to these components. That is, the processing unit 150 may perform operations in addition to operations of these components.

Operations of the transmission processing unit 151 and the notification unit 153 will be described below in detail.

<4.2. Configuration of Terminal Device>

First, an example of the configuration of the terminal device 200 according to an embodiment of the present disclosure will be described with reference to FIG. 6. FIG. 6 is a block diagram illustrating the example of the configuration of the terminal device 200 according to an embodiment of the present disclosure. According to FIG. 6, the terminal device 200 includes an antenna unit 210, a radio communication unit 220, a storage unit 230, and a processing unit 240.

(1) Antenna Unit 210

The antenna unit 210 radiates signals output by the radio communication unit 220 out into space as radio waves. In addition, the antenna unit 210 converts radio waves in the space into signals, and outputs the signals to the radio communication unit 220.

(2) Radio Communication Unit 220

The radio communication unit 220 transmits and receives signals. For example, the radio communication unit 220 receives a downlink signal from a base station, and transmits an uplink signal to a base station.

(3) Storage Unit 230

The storage unit 230 temporarily or permanently stores a program and various data for operation of the terminal device 200.

(4) Processing Unit 240

The processing unit 240 provides various functions of the terminal device 200. The processing unit 240 includes an acquisition unit 241 and a reception processing unit 243. Note that the processing unit 240 may further include a structural element other than these structural elements. That is, the processing unit 240 may perform operation other than the operation of these structural elements.

Operations of the acquisition unit 241 and the reception processing unit 243 will be described below in detail.

5. First Embodiment

Next, a first embodiment will be described with reference to FIGS. 7 to 16.

<5.1. Technical Features>

(1) Scrambling and/or Interleaving

The base station 100 has a function of scrambling and/or interleaving transmission signal sequences of a plurality of power layers multiplexed using power allocation.

Specifically, the base station 100 (for example, the transmission processing unit 151) first generates the transmission signal sequences of the plurality of power layers multiplexed using the power allocation. Then, the base station 100 (for example, the transmission processing unit 151) sets each of the transmission signal sequences of one or more power layers among the plurality of power layers as a target and applies at least one of a scrambler using a scramble pattern and an interleaver using an interleave pattern corresponding to information regarding the power allocation. More specifically, the base station 100 scrambles and/or interleaves the transmission signal sequence using the scrambler and/or the interleaver corresponding to the information regarding the power allocation of the target transmission signal sequence (or power layer). Additionally, the base station 100 may scramble and/or interleave the transmission signal sequence using the scrambler and/or the interleaver corresponding to the control information regarding transmission and reception of the target transmission signal sequence (or power layer).

The terminal device 200 has a function of cancelling interference and acquiring a desired signal from signals of the plurality of power layers multiplexed using the power allocation.

Specifically, the terminal device 200 (for example, the acquisition unit 241) first acquires the information regarding the power allocation of the plurality of power layers multiplexed using the power allocation. Then, the terminal device 200 (for example, the reception processing unit 243) performs interference cancellation using at least one of a descrambler using a scramble pattern and a deinterleaver using an interleave pattern corresponding to the acquired information regarding the power allocation. More specifically, the terminal device 200 generates replica signals and performs interference cancellation using the descrambler and/or the interleaver corresponding to the information regarding the power allocation of an interference cancellation target signal (or power layer). Additionally, the terminal device 200 may generate replica signals and perform interference cancellation using the descrambler and/or the interleaver corresponding to control information regarding transmission and reception of the interference cancellation target signal (or power layer).

Meanwhile, the expression "multiplexing a power layer" has the same meaning as "multiplexing a signal of the power layer" in this specification. In addition, the expression "allocating power to the power layers" has the same meaning as "allocating power to signals of the power layers."

(a) Multiplexing using Power Allocation

For example, the multiple power layers are power layers multiplexed using SPC.

The base station 100 (for example, the transmission processing unit 151) performs the power allocation in conformity with any standard. The information regarding the power allocation is information regarding power allocated to the transmission signal sequences of the power layers and includes, for example, a power layer index. Hereinafter, a relation between the power layer index and the allocated power will be described with reference to FIG. 7.

Figure 7:
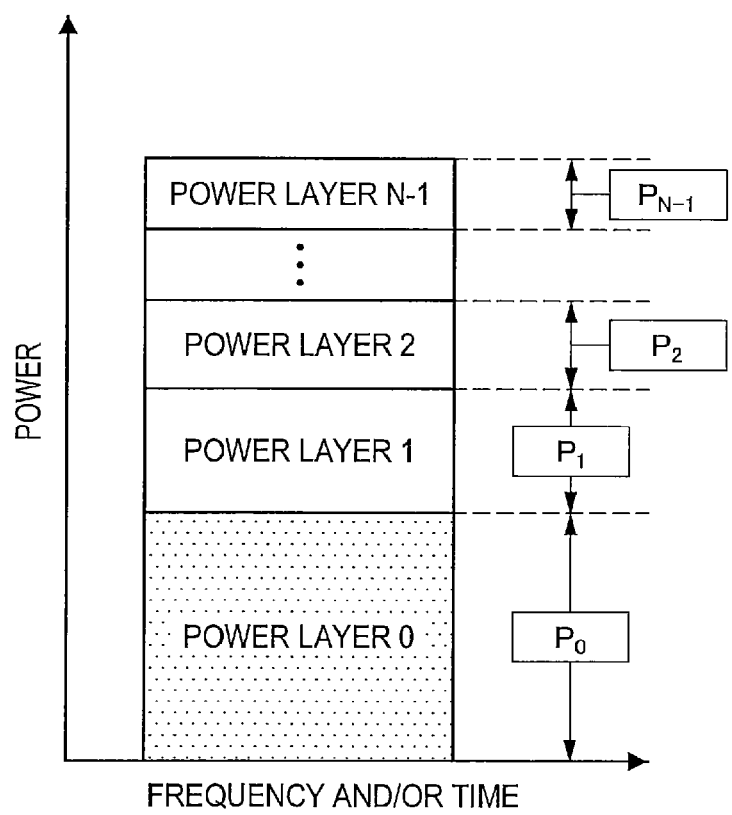
FIG. 7 is an explanatory diagram for explaining an example of power allocation to power layers.

FIG. 7 is an explanatory diagram for explaining an example of the power allocation to the power layers. The horizontal axis represents frequency resources and/or time resources and the vertical axis represents a power level (height of the allocated power). Referring to FIG. 7, N power layers (power layer 0 to power layer N−1) multiplexed using SPC are illustrated. The numerals 0 to N−1 are referred to as power layer indexes. The height of the power layer (that is, the width in the vertical direction) indicates the height of allocated power. In the example illustrated in FIG. 7, in a power layer with a smaller index, allocated power is higher. For example, power $P_0$ is higher than power $P_1$, power $P_1$ is higher than power $P_2$, and $P_{N-1}$ is the lowest. The transmission signal sequences multiplexed using SPC are transmitted using at least one power layer.

However, a relation between the power layer index and the allocated power is not limited to the example illustrated in FIG. 7. For example, the power layer index to which the highest power is allocated may not be 0. In addition, in a power layer with a smaller index, the allocated power may be lower.

(b) Generation of Transmission Signal Sequence

For example, a transmission signal sequence is an encoded bit sequence (that is, a bit sequence that has been encoded). The base station 100 (the transmission processing unit 151) generates an encoded bit sequence of the multiple power layers.

Specifically, for example, the base station 100 performs CRC encoding, FEC encoding, rate matching or the like (as shown in FIG. 2, for example) on each of the multiple power layers to generate the encoded bit sequence of the power layer. Then, the base station 100 performs symbol modulation by applying or not applying the scrambler and/or the interleaver to the encoded bit sequence. A symbol-modulated signal is equivalent to described above.

(c) Scramble Pattern

The base station 100 (for example, the transmission processing unit 151) can generate a scramble pattern to be applied to the transmission signal sequence on the basis of various parameters. For example, the base station 100 can generate the scramble pattern using at least one of the parameters indicated in the following Table 1. The parameters can be classified into the information regarding the power allocation and the control information regarding transmission and reception.

TABLE 1

| | Parameters | 3GPP specification | Present technology |
|---|---|---|---|
| Information regarding power allocation | User Index (RNTI) | ○ | — |
| | Codeword Index | ○ | ○ |
| | Subframe Index | ○ | ○ |
| | Cell ID | ○ | ○ |
| | Power Layer Index | — | ○ |
| | Power Table Index | — | ○ |
| | Power Allocation Rate | — | ○ |
| | Channel Quality Indicator (CQI) | — | ○ |
| Control information regarding transmission and reception | Redundancy Version (RV) Index | — | ○ |
| | Transmission Mode | — | ○ |
| | Downlink Control Information (DCI) Format | — | ○ |
| | Modulation and Coding Scheme (MCS) | — | ○ |

As indicated in the foregoing Table 1, an RNTI is used to generate a scramble pattern in the 3GPP specification. In the present technology, however, an RNTI may not be used to generate a scramble pattern.

(c-1) Information Regarding Power Allocation

The base station 100 (for example, the transmission processing unit 151) may generate the scramble pattern corresponding to the information regarding the power allocation.

Power Layer Index

The information regarding the power allocation may include a target power layer index. That is, the base station 100 may generate the scramble pattern using the power layer index of a scramble target transmission signal sequence instead of an RNTI or the like.

Power Table Index

The information regarding the power allocation may include a power table index regarding a target power layer. That is, the base station 100 may generate the scramble pattern using the power table index ($P_{TBI}$ to be described below) regarding the power layer of a scramble target transmission signal sequence instead of an RNTI or the like. An example of the power table index is shown in Table 2.

TABLE 2

| Power Table Index $P_{TBI} =$ $P_{TBI, Row}|P_{TBI, Col}$ | $P_{TBI, Row} =$ 000000 | $P_{TBI, Row} =$ 000001 | ... | $P_{TBI, Row} =$ 001111 |
|---|---|---|---|---|
| Power Layer Index $P_{TBI, Col} =$ 000000 | 80% | 70% | ... | 50% |
| Power Layer Index $P_{TBI, Col} =$ 010000 | 10% | 15% | ... | 25% |
| Power Layer Index $P_{TBI, Col} =$ 100000 | 7% | 10% | ... | 15% |
| Power Layer Index $P_{TBI, Col} =$ 110000 | 3% | 5% | ... | 10% |

In the example shown in the foregoing Table 2, 2 high-order bits of the power table index PTBI indicate the power layer index and 4 low-order bits indicate a pattern of power allocated to each of the plurality of power layers. That is, the power table index is information formed by combining the power layer index and information indicating a pattern of the power allocated to each of the plurality of power layers. A percentage in the table indicates a rate of power allocation and a total sum of rates allocated to all the power layers in each pattern is 100%. For example, in a pattern "0000," power of 80% is allocated to power layer "00," power of 10% is allocated to power layer "01," power of 7% is allocated to power layer "10," and power of 3% is allocated to power layer "11."

Meanwhile, although the foregoing Table 2 shows the example in which a total number of power layers is 4 and a total number of patterns is 16, the present technology is not limited to this example. Regardless of the total numbers of power layers and patterns used, the power table is preferably known and common to the base station 100 and the terminal device 200 in the system 1. This is because the user can comprehend the power allocated to all the power layers when the user merely knows the index $P_{TBI}$ of the user in the power table.

Power Allocation Rate

The information regarding the power allocation may include information indicating a value of the power allocated to a target power layer. That is, the base station 100 may generate the scramble pattern using information indicating a value of power allocated to the target power layer (for example, a power allocation rate) instead of an RNTI or the like. The information indicating the value of the power allocated to the target power layer may be a power allocation rate from 0% to 100%. Additionally, the information indicating the value of the power allocated to the target power layer may be an index $P_{Rate}$ indicating the power allocation rate illustrated in the following Table 3.

TABLE 3

| Power Allocation Rate $P_{Rate}$ | Rate |
|---|---|
| $P_{Rate} = 0000$ | 0% |
| $P_{Rate} = 0001$ | 10% |
| ... | ... |
| $P_{Rate} = 1110$ | 95% |
| $P_{Rate} = 1111$ | 100% |

Meanwhile, although the foregoing Table 3 shows an example in which the number of indexes $P_{Rate}$ indicating the power allocation rate is 16, the present technology is not limited to this example. The number of indexes is arbitrary and the value of the power allocation rate corresponding to the index is also arbitrary.

Channel Quality Indicator (CQI) of Target User

The information regarding the power allocation may include a CQI of a target user. That is, the base station 100 may generate the scramble pattern using the CQI of the target user instead of an RNTI.

Here, a CQI is an index indicating a channel state of which the user notifies the base station and which is defined in, for example, "3GPP TS 36.213: 'Evolved Universal Terrestrial Radio Access (E-UTRA): Physical layer procedures.'" Further, in SPC, a method of deciding the power allocation rate in accordance with a channel state of each user is considered as one proposal. Even in this method, CQI can also be comprehended as the information regarding the power allocation.

For example, CQI tables described in the foregoing document are shown in the following Tables 4 and 5.

TABLE 4

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 5

| CQI index | modulation | code rate × 1024 | efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

(c-2) Control Information Regarding Transmission and Reception

The base station 100 (for example, the transmission processing unit 151) may generate the scramble pattern corresponding to the control information regarding transmission and reception. Further, to generate the scramble pattern, the base station 100 may use only the information regarding the power allocation, may use only the control information regarding transmission and reception, or may use both the information regarding the power allocation and the control information regarding transmission and reception in combination.

Redundancy Version (RV) Index

The control information regarding transmission and reception may include information indicating the number of retransmissions of the transmission signal sequence. That is, the base station 100 may generate the scramble pattern using the information indicating the number of retransmissions of the transmission signal sequence instead of an RNTI or the like. An example of the information indicating the number of retransmissions of the transmission signal sequence includes an RV index.

The RV index is an index indicating the number of retransmissions of a hybrid automatic repeat request (HARQ) defined in "3GPP TS 36.213: 'Evolved Universal Terrestrial Radio Access (E-UTRA): Physical layer procedures.'" The RV index takes, for example, values of 0, 1, 2, and 3. In a case in which the base station 100 uses the RV index to generate the scramble pattern, the scramble pattern is changed in accordance with the number of retransmissions. Thus, since the scramble pattern is randomized in accordance with the number of retransmissions, an improvement in an error rate feature at the time of retransmission is expected.

Transmission Mode

The information regarding transmission and reception may include information indicating a transmission mode. That is, the base station 100 may generate the scramble pattern using the information indicating the transmission mode instead of an RNTI or the like.

The transmission mode is defined in "3GPP TS 36.213: 'Evolved Universal Terrestrial Radio Access (E-UTRA): Physical layer procedures.'" The information indicating the transmission mode indicates, for example, a transmission scheme such as SIMO/MIMO, transmit diversity, an open/closed Loop, or spatial multiplexing. In a case in which the base station 100 uses the information indicating the transmission mode to generate the scramble pattern, signal randomization is realized and an improvement in the error rate feature is expected.

Downlink Control Information Format (DCI Format)

The control information regarding transmission and reception may include information indicating a DCI format. That is, the base station 100 may generate the scramble pattern using the information indicating the DCI format corresponding to the transmission signal sequence instead of an RNTI.

The DCI format is defined in "3GPP TS 36.212: 'Evolved Universal Terrestrial Radio Access (E-UTRA): Multiplexing and channel coding.'" As the DCI format, for example, formats 0, 1, 1A, 1B, 1C, 1D, 2, 2A, 2B, 2C, 2D, 3, 3A, and 4 are defined to notify of various kinds of information such as MCS, an RV index, and a CQI request. In a case in which the base station 100 uses the information indicating the DCI format to generate the scramble pattern, signal randomization is realized and an improvement in the error rate feature is expected.

Modulation and Coding Scheme (MCS)

The control information regarding transmission and reception may include information indicating MCS. That is, the base station 100 may generate the scramble pattern using the information indicating MCS instead of an RNTI or the like.

As the information indicating MCS, an MCS index defined in "3GPP TS 36.213: 'Evolved Universal Terrestrial Radio Access (E-UTRA): Physical layer procedures'" can be exemplified. The MCS index is information indicating a combination of a modulation order and a transmit block size (TBS). In a case in which the base station 100 uses the information indicating the MCS to generate the scramble pattern, signal randomization is realized and an improvement in the error rate feature is expected.

For example, the following Tables 6 and 7 show MCS tables described in the foregoing document.

TABLE 6

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

TABLE 7

| MCS Index $I_{MCS}$ | Modulation Order $Q_m$ | TBS Index $I_{TBS}$ |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 11 |
| 7 | 4 | 12 |
| 8 | 4 | 13 |
| 9 | 4 | 14 |
| 10 | 4 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 8 | 25 |
| 21 | 8 | 27 |
| 22 | 8 | 28 |
| 23 | 8 | 29 |
| 24 | 8 | 30 |
| 25 | 8 | 31 |
| 26 | 8 | 32 |
| 27 | 8 | 33 |
| 28 | 2 | reserved |
| 29 | 4 | |
| 30 | 6 | |

(d) Interleave Pattern

The base station 100 (for example, the transmission processing unit 151) can generate an interleave pattern which is applied to the transmission signal sequence on the basis of various parameters. For example, the base station 100 can generate the scramble pattern using at least one of the parameters shown in the foregoing Table 1 as in the scramble pattern. Since the specific content of the parameters has been described above, the detailed description thereof will be omitted here.

(e) Notification of Information

As described above, in a case in which the user performs interference cancellation using SIC, the scramble pattern and/or the interleave pattern used in the interference signal is preferably known. Therefore, the base station 100 notifies each user of information enabling the scramble pattern and/or the interleave pattern used in the interference signal to be reproduced.

Here, the interference signal which is an interference cancellation target is a signal that has higher reception strength than a desired signal. That is, when multiplexing is performed using SPC in the base station 100, a signal of a power layer of which the allocated power is higher than a power layer of a desired signal is an interference cancellation target. The user can improve the error rate feature at the time of generation of an interference signal replica by cancelling an interference signal in order from a power layer in which power is higher. Therefore, the base station 100 notifies of information enabling the scramble pattern and/or the interleave pattern used in the signal of the power layer in which power to be allocated is higher than the power layer of a signal destined for the user who is a notification destination to be reproduced. Further, information enabling the scramble pattern and/or the interleave pattern used in the signal of the power layer in which power to be allocated is lower than the power layer of a signal destined for the user who is a notification destination to be reproduced may be excluded from a notification target.

Hereinafter, the scramble pattern will be the focus of the description, but the same description applies to the interleave pattern.

(e-1) Information Regarding Power Allocation

In a case in which the scramble pattern is generated using the information regarding the power allocation, the base station 100 (for example, the notification unit 153) notifies the user who is a destination of the transmission signal sequence of the plurality of power layers, of information regarding the power allocation. Thus, since the user can know the information used to generate the scramble pattern, the scramble pattern used in an interference cancelation target signal can be reproduced.

Power Layer Index

In a case in which the scramble pattern is generated using the power layer index, the base station 100 notifies the user who is a notification destination of the power layer index of the transmission signal sequence as the information regarding the power allocation. Hereinafter, the power layer of the transmission signal sequence of which the user who is the notification destination is notified is also referred to as a target power layer.

For example, if a relation between the power layer index and the power level is known, as illustrated in FIG. 7, the user can know the index of another power layer in which the power level is higher than the power layer of the user by merely knowing the index of the power layer of the user. Specifically, when the notified power layer index of which the user is notified is 1, the user can know that the power layer index used to generate the scramble pattern used in the interference cancellation target signal is 0. Since the user can know the index of the power layer used to generate the scramble pattern used in the interference cancellation target signal, the scramble pattern can be reproduced.

Since the notified information is the target power layer index and does not include information regarding another user, a consumption amount of radio resources can be suppressed compared to a case in which an RNTI is used to generate the scramble pattern.

However, the relation between the power layer index and the power level is not known in some cases. Therefore, the base station 100 may notify of information indicating the relation between the power layer index and the power level.

For example, the following four patterns are assumed in regard to the relation between the power layer index and the power level. Here, k denotes a target power layer index, N denotes a total number of power layers, k' denotes an index serving as a starting point, and $P_0, \ldots, P_{N-1}$ denote power allocated to the power layers.

1. An index of a starting point at which power increases as an index increases is 0

$P_0 \leq \ldots \leq P_k \leq \ldots \leq P_{N-1}$

2. An index of a parting point at which power decreases as an index increases is N−1

$P_{N-1} \leq \ldots \leq P_k \leq \ldots \leq P_0$

3. An index of a starting point at which power increases as an index increases is k'

$P_k \leq \ldots \leq P_k \leq \ldots \leq P_{N-1} \leq P_0 \leq \ldots \leq P_{k'-1}$ 4. An index of a starting point at which power decreases as an index increases is k'

$P_k \leq \ldots \leq P_0 \leq \ldots \leq P_{N-1} \leq P_k \leq \ldots \leq P_{k'+1}$ In regard to the foregoing four patterns, the base station 100 notifies of a total number of a plurality of power layers, information indicating a relation between an increase or decrease direction of the power layer index and an increase or decrease direction of the allocated power, and an index serving as a starting point of the increase or decrease direction of the allocated power as the information regarding the power allocation. Further, the information indicating the relation between the increase or decrease direction of the power layer index and the increase or decrease direction of the allocated power is information indicating whether the power increases or decreases as the index increases.

By being notified of the information, the user can know the power layer index of the interference cancellation target signal. For example, in regard to Pattern 1, k+1, . . . , N−1 are power layer indexes of the interference cancellation target signal. In regard to Pattern 2, 0, . . . , k−1 are power layer indexes of the interference cancellation target signal. In regard to Pattern 3, k+1, . . . , N−1, 0, . . . , k'−1 are power layer indexes of the interference cancellation target signal.

In regard to Pattern 4, k−1, . . . , k'+1 are power layer indexes of the interference cancellation target signal.

Further, in a case in which the index serving as the starting point is 0 or N−1, the notification of the index serving as the starting point may be omitted. In addition, in a case in which the total number of power layers is 2, the notification of the information indicating the relation between the increase or decrease direction of the power layer index and the increase or decrease direction of the allocated power and the notification of the index serving as the starting point may be omitted.

Power Table Index

In a case in which the scramble pattern is generated using the power table index, the base station 100 notifies the user who is a notification destination of the power table index of the transmission signal sequence as the information regarding the power allocation. Here, as described above with reference to Table 2, the power table index is information formed by combining the power layer index and the information indicating a pattern of the power allocated to each of the plurality of power layers.

The user can know the power table index of the desired signal and the power table index of the interference cancellation target signal from the notified information. Thus, the user can reproduce the scramble pattern used in the interference cancellation target signal.

Power Allocation Rate

In a case in which the scramble pattern is generated using a value of the power allocated to the target power layer, the base station 100 notifies of information indicating the value of the power allocated to each of the plurality of power layers as the information regarding the power allocation. For example, in a case in which the scramble pattern is generated using the power allocation rate shown in the foregoing Table 3, the base station 100 notifies of the index $P_{Rate}$ indicating the power allocation rate of each of the plurality of power layers.

The user can know the value of the power allocated to the power layer of the desired signal and the value of the power allocated to the power layer of the interference cancellation target signal from the notification information. Thus, the user can reproduce the scramble pattern used in the interference cancellation target signal.

CQI

In a case in which the scramble pattern is generated using a CQI of a target user, the base station 100 notifies of the CQI of one or more other users who are destinations of the transmission signal sequences of the plurality of power layers as the information regarding the power allocation.

The user can know the CQI of each of the one or more users who are destinations of the interference cancellation target signal from the notified information. Thus, the user can reproduce the scramble pattern used in the interference cancellation target signal.

(e-2) Control Information Regarding Transmission and Reception

In a case in which the scramble pattern is generated using the control information regarding transmission and reception, the base station 100 (for example, the notification unit 153) notifies of the control information regarding transmission and reception of each of the transmission signal sequences of the plurality of power layers. Thus, since the user can know the information used to generate the scramble pattern, the user can reproduce the scramble pattern used in the interference cancellation target signal.

For example, the base station 100 notifies of information indicating the RV index, the transmission mode, the format of the corresponding DCI, and MCS of each of the transmission signal sequences of the plurality of power layers.

(e-3) Notification Means

The base station 100 may perform notification as radio resource control (RRC) signaling or a part of an RRC message. Additionally, the base station 100 may perform notification as a part of system information. Additionally, the base station 100 may perform notification as a part of DCI.

(f) Multiplexing Target

The base station 100 (for example, the transmission processing unit 151) may select a multiplexing target transmission signal sequence in accordance with the control information regarding transmission and reception used to generate the scramble pattern and/or the interleave pattern.

For example, the transmission signal sequences of the plurality of power layers multiplexed using the power allocation may be transmission signal sequences to users in which the control information regarding transmission and reception is identical. In this case, the scramble pattern and/or the interleave pattern used at the time of generation of an interference signal replica is generated using the control information regarding transmission and reception which is the same as that of the user. Therefore, the user can reproduce the scramble pattern and/or the interleave pattern used in the interference cancellation target signal using the control information regarding transmission and reception of the user. Accordingly, the base station 100 (for example, the notification unit 153) can omit the notification of the control information regarding transmission and reception.

On the other hand, the transmission signal sequences of the plurality of power layers multiplexed using the power allocation may be transmission signal sequences to users of which the control information regarding transmission and reception is different. That is, irrespective of the value of the control information, the multiplexing may be performed using the power allocation by setting the transmission signal sequences to all the users as targets. In this case, the base station 100 (for example, the notification unit 153) notifies of the control information regarding transmission and reception of all the users, which is superimposed in the power layers.

The base station 100 (for example, the transmission processing unit 151) may combine the multiplexing using SPC and spatial multiplexing. In this case, the base station 100 performs multiplexing using SPC for each of the plurality of spatial layers multiplexed using spatial allocation. Specifically, the base station 100 sets each of the transmission signal sequences of the plurality of power layers multiplexed using the power allocation in the allocated spatial layers as a target and applies at least one of the scrambler using the scramble pattern and the interleaver using the interleave pattern corresponding to the information regarding the power allocation. Of course, the base station 100 may use the control information regarding transmission and reception to generate the scramble pattern and/or the interleave pattern.

(2) Process on Reception Side (a) Acquisition of Information

The terminal device 200 (for example, the acquisition unit 241) acquires the information regarding the power allocation of the plurality of power layers multiplexed using the power allocation. In addition, the terminal device 200 acquires the control information regarding transmission and reception of the transmission signal sequences transmitted in the plurality of power layers multiplexed using the power allocation. The acquired information is information of which the base station 100 notifies. For example, the terminal device 200 acquires at least one of the RRC signaling or the RRC message and the system information or the DCI.

(b) Reproduction of Scramble Pattern and/or Interleave Pattern

The terminal device 200 (the reception processing unit 243) reproduces the scramble pattern and/or the interleave pattern used on the transmission side in regard to each of the power layers on the basis of the acquired information regarding the power allocation and/or the acquired control information regarding transmission and reception.

For example, the terminal device 200 generates the scramble pattern corresponding to the information regarding the power allocation in a case in which the information regarding the power allocation is used to generate the scramble pattern on the side of the base station 100. In addition, the terminal device 200 generates the scramble pattern corresponding to the control information regarding transmission and reception in a case in which the control information regarding transmission and reception is used to generate the scramble pattern on the side of the base station 100. The same also applies to the interleave pattern.

(c) Interference Cancellation

The base station 100 (the reception processing unit 243) performs interference cancellation using the descrambler using the reproduced scramble pattern and/or the deinterleaver using the reproduced interleave pattern.

<5.2. Process Flow>

Next, examples of processes according to the first embodiment will be described with reference to FIGS. 8 to 16.

(1) Transmission Process

Figure 8:
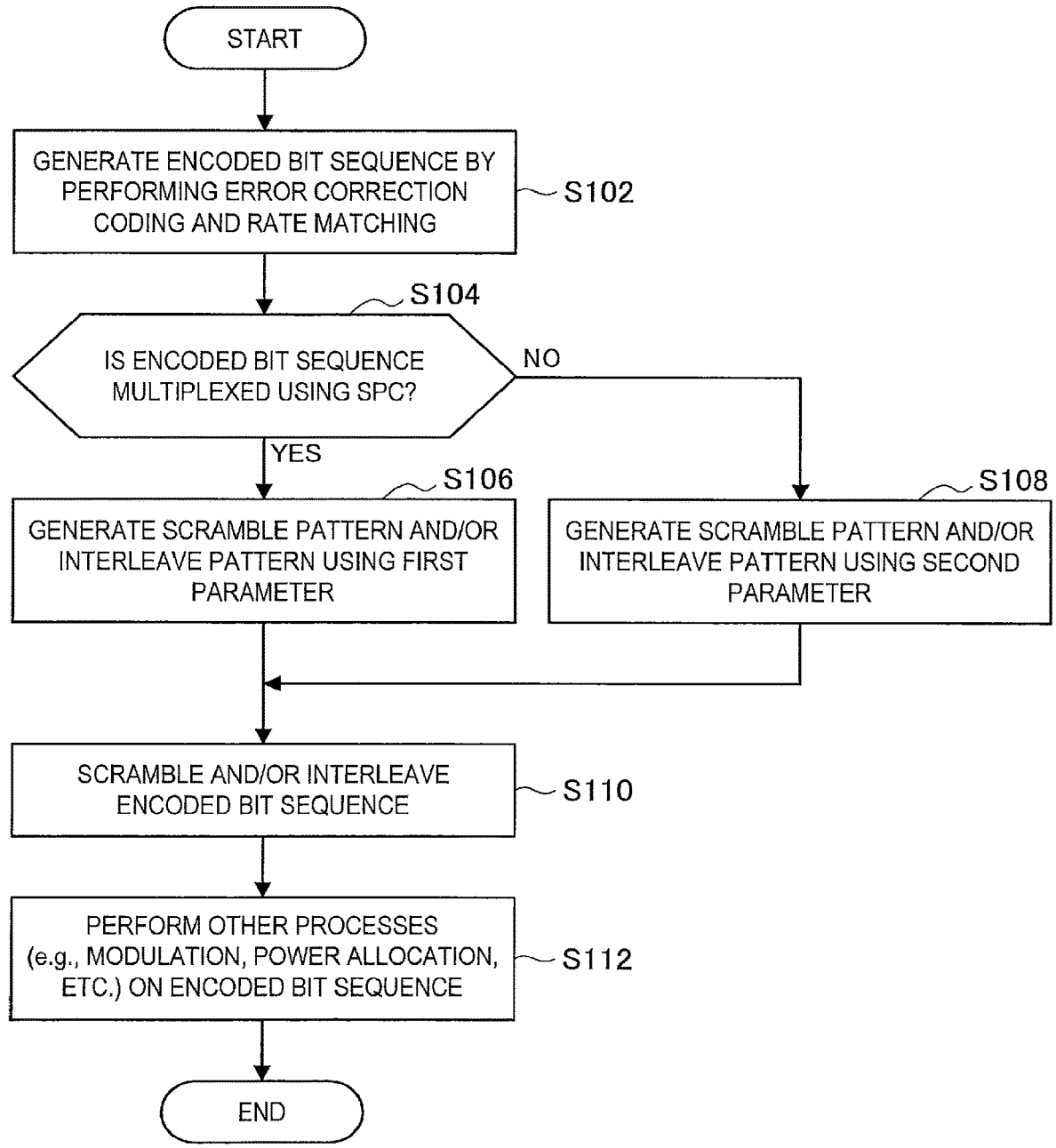
FIG. 8 is a flowchart illustrating an example of a schematic flow of a transmission process of a base station according to the first embodiment.

FIG. 8 is a flowchart illustrating an example of a schematic flow of a transmission process of the base station 100 according to the first embodiment.

The base station 100 (the transmission processing unit 151) generates an encoded bit sequence by performing error correction coding and rate matching (S102).

In a case in which the encoded bit sequence is multiplexed using SPC (S104: YES), the base station 100 (the transmission processing unit 151) generates the scramble pattern and/or the interleave pattern using a first parameter (step S106). The first parameter is at least one of the parameters shown in the foregoing Table 1 and used in the present technology.

Otherwise (S104: No), the base station 100 (the transmission processing unit 151) generates the scramble pattern and/or the interleave pattern using a second parameter (S108). The second parameter is at least one of the parameters shown in the foregoing Table 1 and used in the 3GPP specification.

Then, the base station 100 (the transmission processing unit 151) scrambles and/or interleaves the encoded bit sequence using the generated scramble pattern and/or interleave pattern (S110).

The base station 100 (the transmission processing unit 151) performs other processes (e.g., modulation, power allocation, etc.) on the encoded bit sequence (which has been interleaved and/or scrambled) (S112). Then, the processes end.

(2) Reception Process (a) Reception Process

Figure 9:
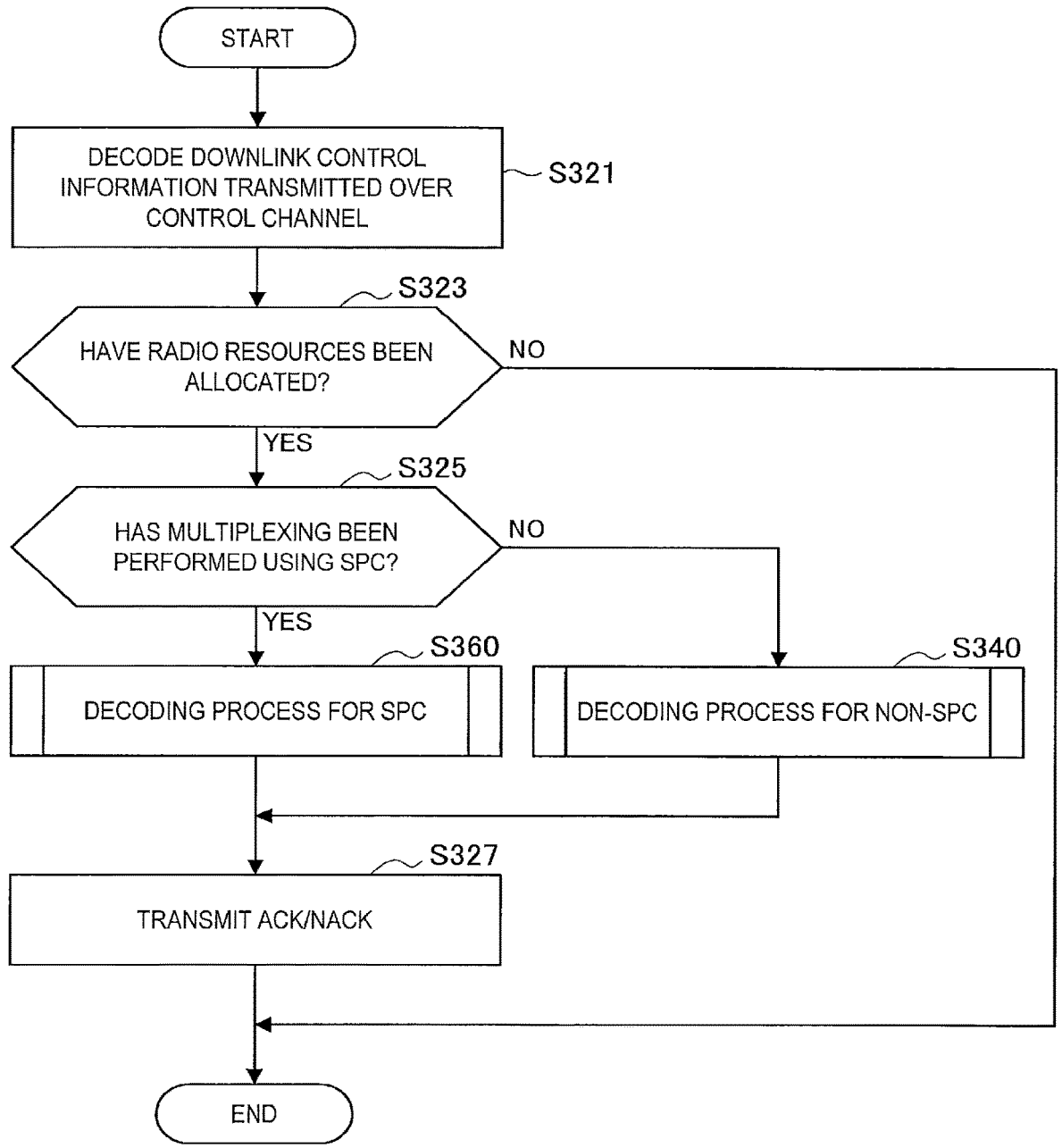
FIG. 9 is a flowchart illustrating an example of a schematic flow of a reception process of a terminal device according to the first embodiment.

FIG. 9 is a flowchart illustrating an example of a schematic flow of a reception process of the terminal device 200 according to the first embodiment. For example, the reception process is performed for each subframe.

The terminal device 200 (the reception processing unit 243) decodes downlink control information (DCI) transmitted over a control channel (S321). For example, the control channel is a PDCCH.

When radio resources have been allocated to the terminal device 200 (S323: YES) and multiplexing using SPC has been performed (S325: YES), the terminal device 200 performs a decoding process for SPC (S360). For example, the decoding process for SPC is interference cancellation (IC), interference suppression (IS), maximum likelihood decoding (MLD) or the like. Subsequently, the terminal device 200 (the processing unit 240) transmits ACK/NACK to the base station 100 (S327). Then, the process ends.

When the radio resources have been allocated to the terminal device 200 (S323: YES) and the multiplexing using SPC has not been performed (S325: NO), the terminal device 200 performs decoding process for non-SPC (S340). For example, the decoding process for non-SPC is a decoding process for orthogonal multiple access (OMA). Subsequently, the terminal device 200 (the processing unit 240) transmits ACK/NACK to the base station 100 (S327). Then, the process ends.

When the radio resources have not been allocated to the terminal device 200 (S323: NO), the process ends.

(b) Decoding Process for Non-SPC

Figure 10:
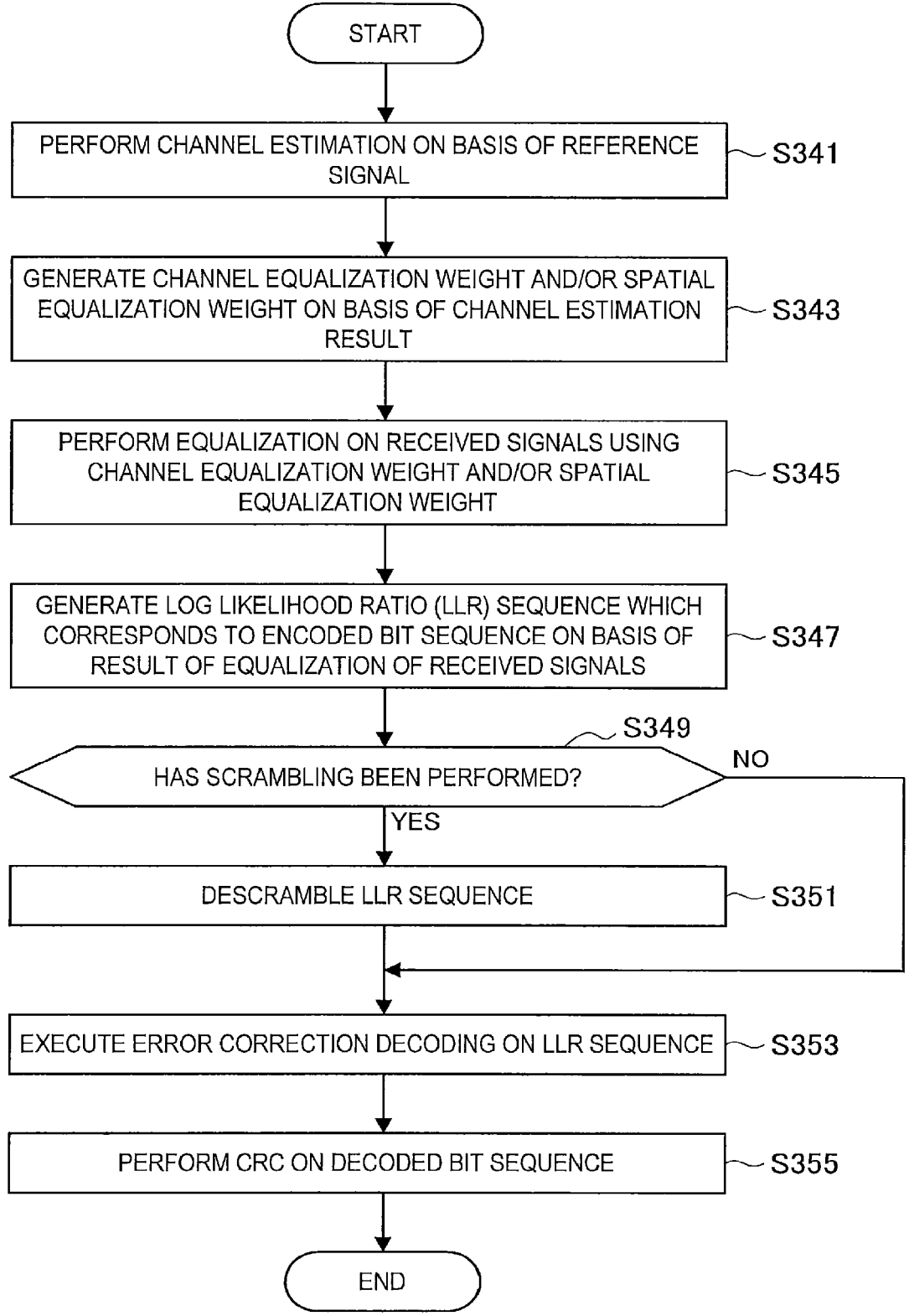
FIG. 10 is a flowchart illustrating an example of a schematic flow of a decoding process for non-SPC.

FIG. 10 is a flowchart illustrating an example of a schematic flow of a decoding process for non-SPC. The decoding process for non-SPC corresponds to step S340 illustrated in FIG. 9.

The terminal device 200 (the reception processing unit 243) performs channel estimation on the basis of a reference signal transmitted by the base station 100 (S341). For example, the reference signal is a cell-specific reference signal (CRS) or a demodulation reference signal (DM-RS). For example, when a precoding matrix is not used (or a specific matrix (e.g., a unit matrix or a diagonal matrix) is used as the precoding matrix) while transmission is performed, the terminal device 200 performs channel estimation on the basis of a CRS. Conversely, when a precoding matrix selected from a plurality of precoding matrices is used while transmission is performed, the terminal device 200 performs channel estimation on the basis of a DM-RS.

The terminal device 200 (the reception processing unit 243) generates a channel equalization weight and/or a spatial equalization weight on the basis of a channel estimation result (S343) and performs equalization on received signals using the channel equalization weight and/or the spatial equalization weight (S345). The channel equalization weight may be a linear equalization weight matrix based on a minimum mean square error (MMSE) scheme or a linear equalization weight matrix based on the zero forcing (ZF) scheme. As a technique other than linear equalization, maximum likelihood (ML) detection, ML estimation, iterative detection/iterative cancellation), turbo equalization, or the like may be used.

The terminal device 200 (the reception processing unit 243) generates a log likelihood ratio (LLR) sequence of a reception side which corresponds to the encoded bit sequence on the basis of the result of the equalization of the received signals (S347).

When scrambling has been performed on the reception side (S349: YES), the terminal device 200 (the reception processing unit 243) scrambles the LLR sequence (S351). Although not illustrated in FIG. 10, in a case in which the interleaving has been performed on the transmission side, the terminal device 200 (the reception processing unit 243) deinterleave the LLR sequence. An order of the descrambling and the deinterleaving corresponds to an order on the transmission side.

The terminal device 200 (the reception processing unit 243) executes error correction coding on the LLR sequence (which has been scrambled) (S353). For example, the error correction coding is Viterbi decoding, turbo decoding, message passing algorithm decoding or the like.

The terminal device 200 (the reception processing unit 243) performs CRS on the decoded bit sequence (S355). That is, the terminal device 200 checks whether decoding has been correctly performed. Then, the process ends.

(c) Decoding Process for SPC (First Example: SIC)

(c-1) Whole Process

Figure 11:
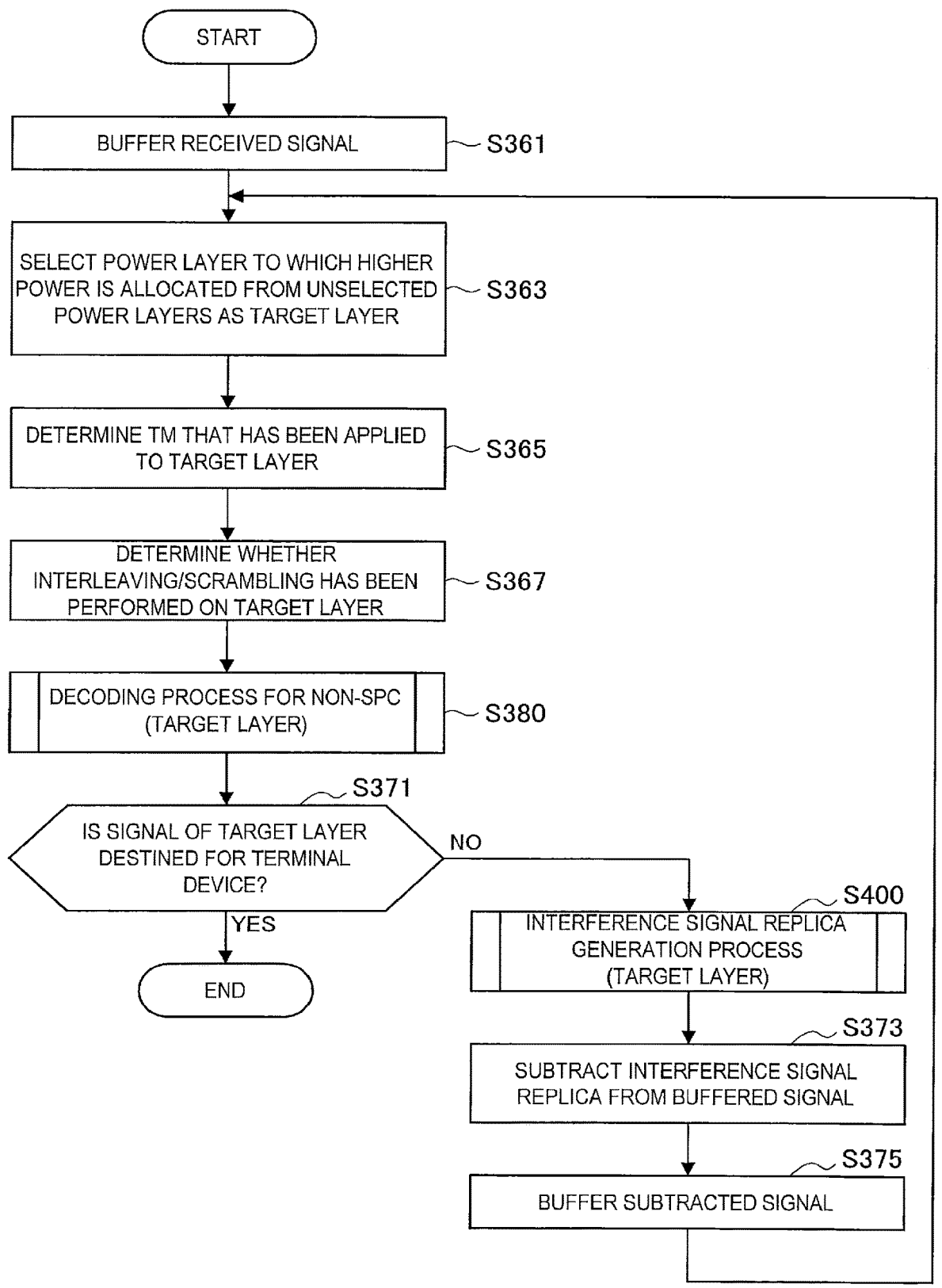
FIG. 11 is a flowchart illustrating a first example of a schematic flow of a decoding process for SPC.

FIG. 11 is a flowchart illustrating a first example of a schematic flow of a decoding process for SPC. The decoding process for SPC corresponds to step S360 illustrated in FIG. 9. In particular, the first example is an example of a process based on successive interference cancellation (SIC).

The terminal device 200 (the reception processing unit 243) buffers a received signal (S361).

The terminal device 200 (the reception processing unit 243) selects a power layer to which higher power is allocated from unselected power layers as a target layer (S363).

The terminal device 200 (the reception processing unit 243) determines a transmission mode (TM) that has been applied to the target layer (S365). In addition, the terminal device 200 (the reception processing unit 243) determines whether interleaving/scrambling has been performed on the target layer (S367). Then, the terminal device 200 performs a decoding process for non-SPC on the target layer (S380).

When a signal of the target layer is destined for the terminal device 200 (S371: YES), the process ends.

When the signal of the target layer is not destined for the terminal device 200 (S371: NO), the terminal device 200 (the reception processing unit 243) performs an interference signal replica generation process on the target layer (S400). The terminal device 200 (the reception processing unit 243) generates an interference signal replica by performing the interference signal replica generation process. Then, the terminal device 200 (the reception processing unit 243) subtracts the interference signal replica from the buffered signal (S373) and buffers the subtracted signal (S375) again. Then, the process returns to step S363.

Meanwhile, although only one layer is allocated to one user in the above-described example, the first embodiment is not limited to this example. For example, two or more layers may be allocated to one user. In this case, even when the signal of the target layer is a signal destined for the terminal device 200 in step S371, the process may proceed to step S400 instead of ending In addition, determination of whether interleaving has been performed in step S367 may be performed on the basis of whether the target layer is a power layer with maximum power or whether an interleaver indicated via DCI is used.

(c-2) Decoding Process for Non-SPC for Target Layer

Figure 12:
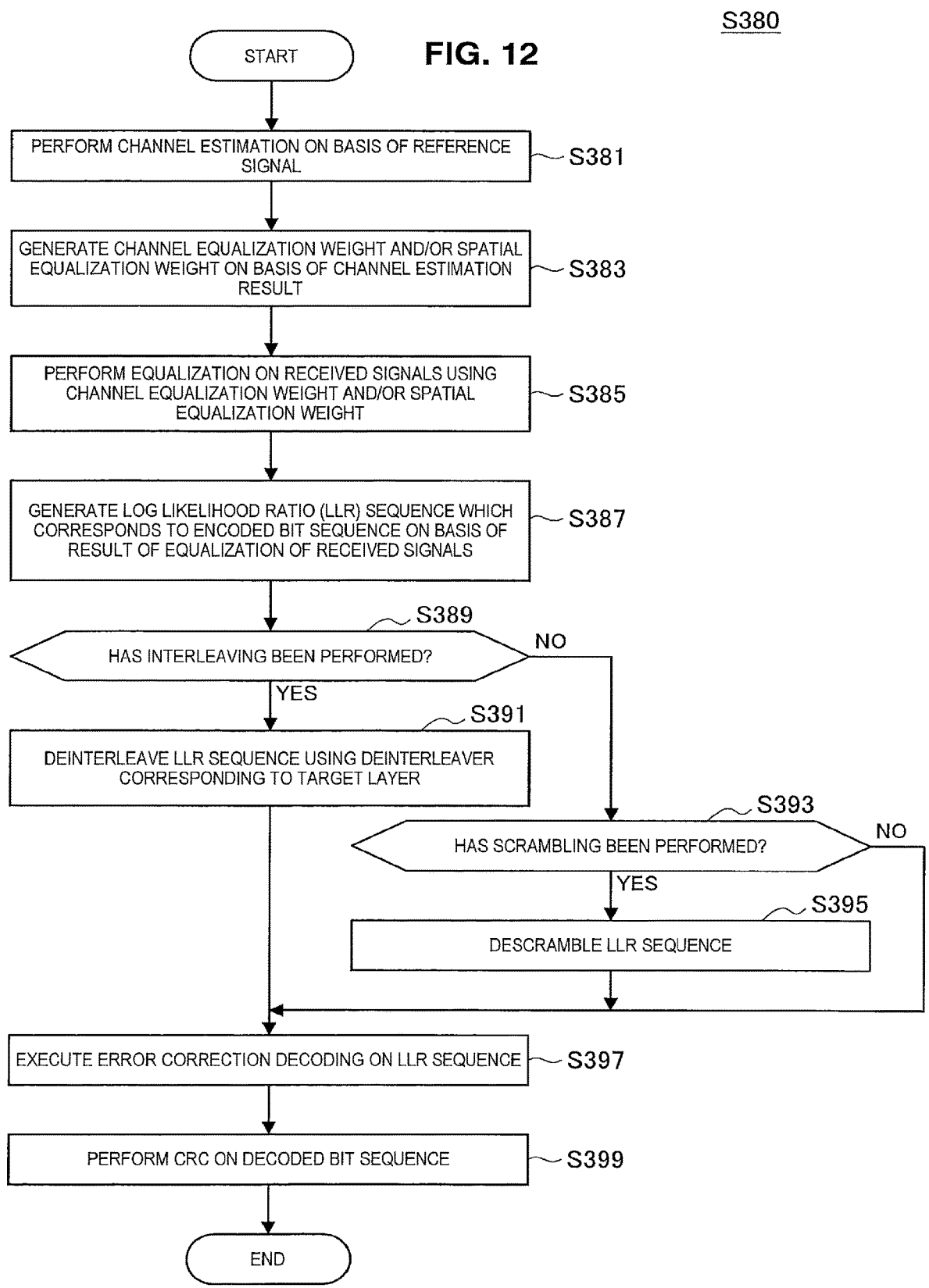
FIG. 12 is a flowchart illustrating an example of a schematic flow of a decoding process for non-SPC for a target layer.

FIG. 12 is a flowchart illustrating an example of a schematic flow of a decoding process for non-SPC for a target layer. The decoding process for non-SPC corresponds to step S380 illustrated in FIG. 12.

Meanwhile, no particular difference exists between a description of steps S381 to S387 and the description of steps S341 to S347 illustrated in FIG. 10. Accordingly, only steps S389 to S399 will be described.

When interleaving has been performed at a transmission side (S389: YES), the terminal device 200 (the reception processing unit 243) deinterleaves the LLR sequence using a deinterleaver corresponding to the target layer (S391). Specifically, the terminal device 200 deinterleaves the LLR sequence using the deinterleaver corresponding to the information regarding the power allocation and/or the control information regarding transmission and reception of the target layer.

When interleaving has not been performed at the transmission side (S389: NO) but scrambling has been performed at the transmission side (S393: YES), the terminal device 200 (the reception processing unit 243) descrambles the LLR sequence (S395). Specifically, the terminal device 200 descrambles the LLR sequence using the descrambler corresponding to the information regarding the power allocation and/or the control information regarding transmission and reception of the target layer.

The terminal device 200 (the reception processing unit 243) executes error correction coding on the LLR sequence (which has been deinterleaved/descrambled) (S397). For example, the error correction coding is Viterbi decoding, turbo decoding, MPA decoding or the like.

The terminal device 200 (the reception processing unit 243) performs CRC on the decoded bit sequence (S399). That is, the terminal device 200 checks whether decoding has been correctly performed. Then, the process ends.

(c-3) Interference Signal Replica Generation Process for Target Layer

Figure 13:
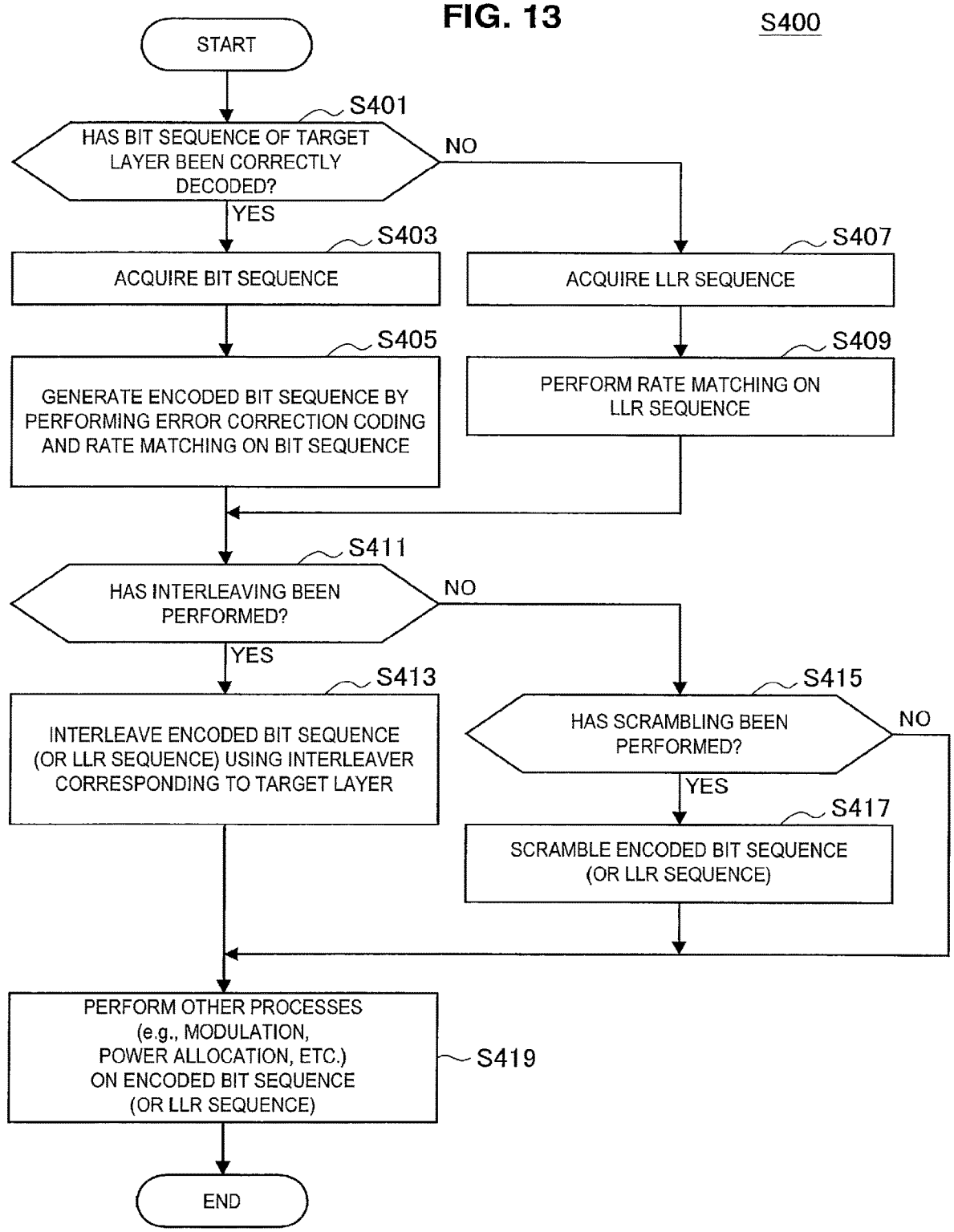
FIG. 13 is a flowchart illustrating an example of a schematic flow of an interference signal replica generation process for a target layer.

FIG. 13 is a flowchart illustrating an example of a schematic flow of an interference signal replica generation process for a target layer. The interference signal replica generation process corresponds to step S400 illustrated in FIG. 11.

When the bit sequence of the target layer has been correctly decoded (S401: YES), the terminal device 200 (the reception processing unit 243) acquires the bit sequence (S403) and generates an encoded bit sequence by performing error correction coding and rate matching on the bit sequence (S405).

Conversely, when the bit sequence of the target layer has not been correctly decoded (S401: NO), the terminal device 200 (the reception processing unit 243) acquires an LLR sequence (S407) and performs rate matching on the LLR sequence (S409). The LLR sequence is a sequence generated in an error correction decoding process.

Whether the bit sequence of the target layer has been correctly decoded (S401) may be determined on the basis of a result of CRC.

When interleaving has been performed at the transmission side (S411: YES), the terminal device 200 (the reception processing unit 243) interleaves the encoded bit sequence (or the LLR sequence) using the interleaver corresponding to the target layer (S413). Specifically, the terminal device 200 interleaves the encoded bit sequence using the interleaver corresponding to the information regarding the power allocation and/or the control information regarding transmission and reception of the target layer.

Conversely, when interleaving has not been performed at the transmission side (S411: NO) but scrambling has been performed at the transmission side (S415: YES), the terminal device 200 (the reception processing unit 243) scrambles the encoded bit sequence (or the LLR sequence) (S417). Specifically, the terminal device 200 scrambles the encoded bit sequence using the scrambler corresponding to the information regarding the power allocation and/or the control information regarding transmission and reception of the target layer.

The terminal device 200 (the reception processing unit 243) performs other processes (e.g., modulation, power allocation, and the like) on the encoded bit sequence (or the LLR sequence) (which has been interleaved or scrambled) (S419). Then, the process ends.

Further, for example, soft modulation is performed on the LLR sequence as another process for the LLR sequence. In the soft modulation, a likelihood of generation of signal point candidates of a modulation symbol (e.g., BPSK, QPSK, 8PSK, 16PSK, 16QAM, 256QAM or the like) are calculated using the LLR sequence, and thus expectations of signal points of the modulation symbol can be generated. Accordingly, influence of a bit decoding error in the generation of the interference signal replica can be reduced.

(d) Decoding Process for SPC (Second Example: PIC)

(d-1) Whole Process

Figure 14:
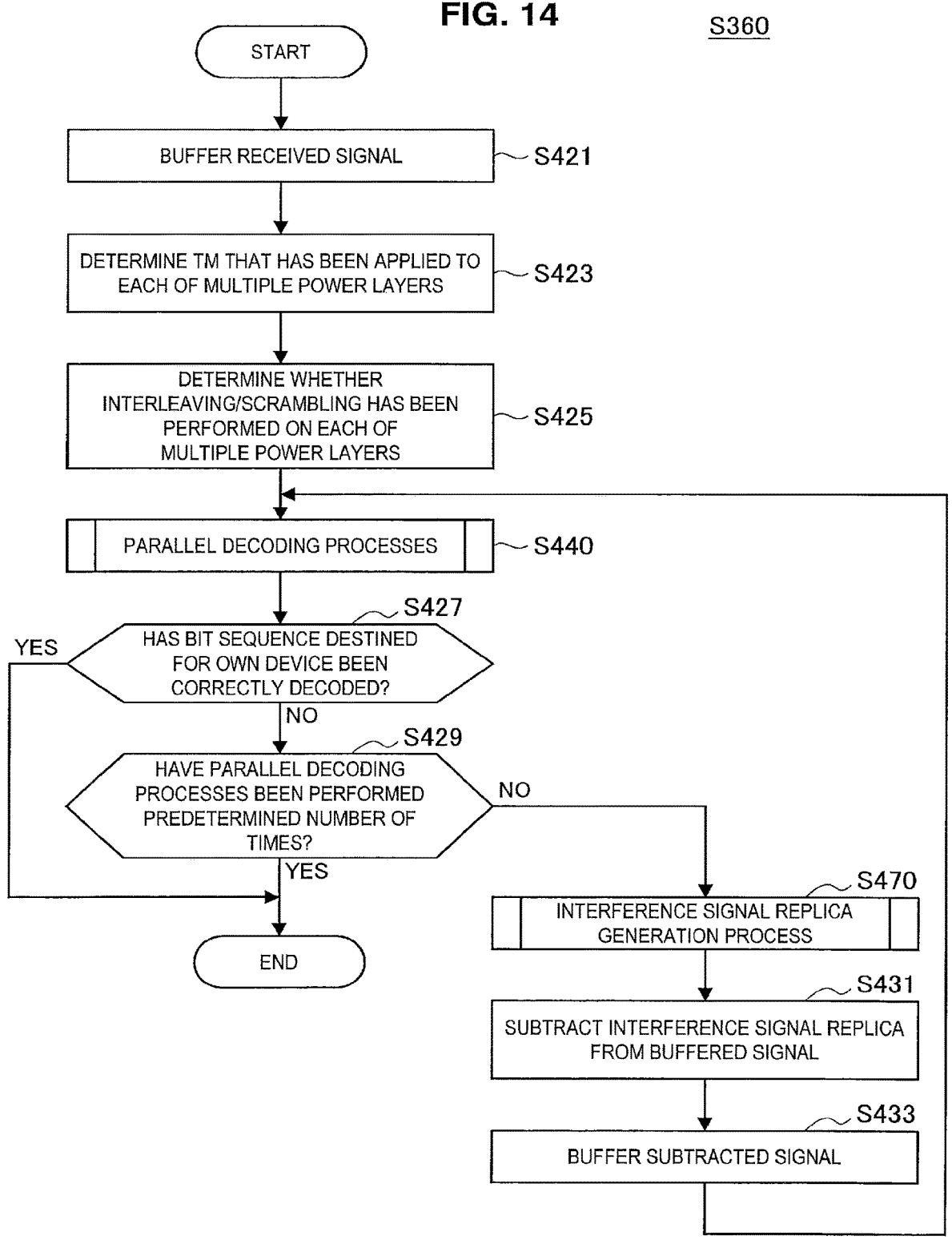
FIG. 14 is a flowchart illustrating a second example of a schematic flow of a decoding process for SPC.

FIG. 14 is a flowchart illustrating an example of a second example of a schematic flow of a decoding process for SPC. The decoding process for SPC corresponds to step S360 illustrated in FIG. 9. Above all, the second example is an example of a process based on parallel interference cancellation (PIC).

The terminal device 200 (the reception processing unit 243) buffers a received signal (S421).

The terminal device 200 (the reception processing unit 243) determines a transmission mode (TM) that has been applied to each of multiple power layers (S423). In addition, the terminal device 200 (the reception processing unit 243) determines whether interleaving/scrambling has been performed on each of the multiple power layers (S425). Then, the terminal device 200 performs parallel decoding processes on the multiple power layers (S440).

When the bit sequence destined for the own device (the terminal device 200) has been correctly decoded (S427: YES), the process ends. In addition, the bit sequence destined for the own device (the terminal device 200) has not been correctly decoded (S427: NO), but the process ends even when parallel decoding processes have been performed multiple times (S429: YES).

When the parallel decoding processes have not been performed multiple times (S429: NO), the terminal device 200 (the reception processing unit 243) performs an interference signal replica generation process (S470). The terminal device 200 (the reception processing unit 243) generates an interference signal replica by performing the interference signal replica generation process. Then, the terminal device 200 (the reception processing unit 243) subtracts the interference signal replica from the buffered signal (S431) and buffers the subtracted signal (S433) again. Then, the process returns to step S440.

Meanwhile, determination of whether interleaving has been performed in step S425 may be performed on the basis of whether the power layer is a power layer with maximum power or whether an interleaver indicated via DCI is used.

(d-2) Decoding Process

Figure 15:
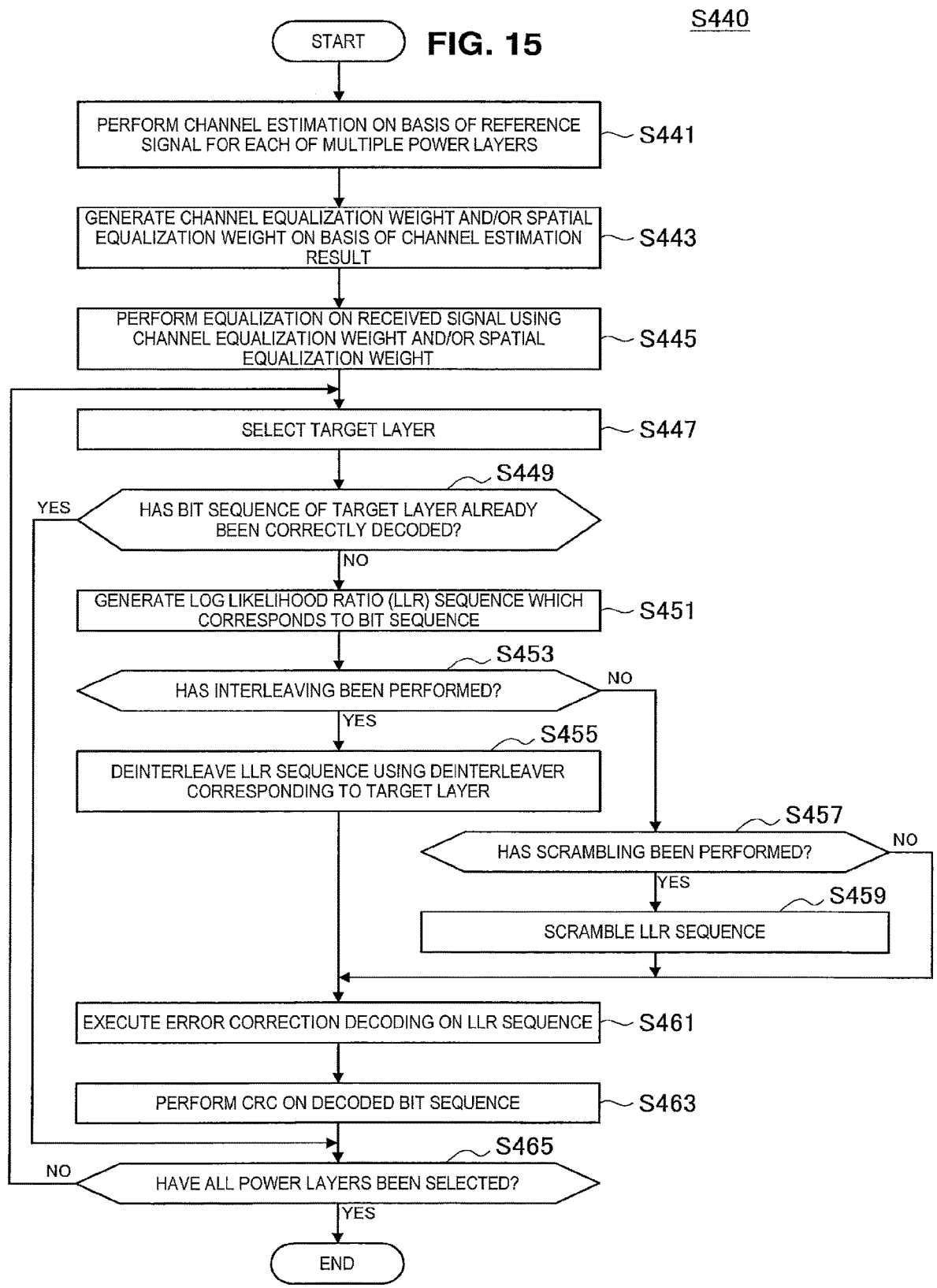
FIG. 15 is a flowchart illustrating an example of a schematic flow of a parallel decoding process.

FIG. 15 is a flowchart illustrating an example of a schematic flow of parallel decoding processes. The parallel decoding processes correspond to step S440 illustrated in FIG. 14.

The terminal device 200 (the reception processing unit 243) performs channel estimation on the basis of a reference signal transmitted by the base station 100 for each of multiple layers (S441). For example, the reference signal is a CRS or a DM-RS. For example, when a precoding matrix is not used (or a specific matrix (e.g., a unit matrix or a diagonal matrix) is used as a precoding matrix) while transmission is performed, the terminal device 200 performs channel estimation on the basis of the CRS. Conversely, when a precoding matrix selected from a plurality of precoding matrices is used while transmission is performed, the terminal device 200 performs channel estimation on the basis of the DM-RS.

The terminal device 200 (the reception processing unit 243) generates a channel equalization weight and/or a spatial equalization weight on the basis of a channel estimation result (S443) and performs equalization on a received signal using the channel equalization weight and/or the spatial equalization weight (S445). The channel equalization weight may be a linear equalization weight matrix based on the MMSE scheme or a linear equalization weight matrix based on the ZF scheme. As a technique other than linear equalization, ML detection, ML estimation, iterative interference cancellation, turbo equalization or the like may be used.

The terminal device 200 (the reception processing unit 243) selects a target layer from the multiple layers (S449).

When the bit sequence of the target layer is already correctly decoded (S449: YES), the process ends when all of the power layers are selected (S465: YES), whereas the process returns to step S447 when all of the power layers are not selected (S465: NO).

When the bit sequence of the target layer is not yet correctly decoded (S449: NO), the terminal device 200 (the reception processing unit 243) generates an LLR sequence of the reception side which corresponds to the encoded bit sequence on the basis of the result of the equalization of the received signal (S451).

When interleaving has been performed at the transmission side (S453: YES), the terminal device 200 (the reception processing unit 243) deinterleaves the LLR sequence using a deinterleaver corresponding to the target layer (S455). Specifically, the terminal device 200 deinterleaves the LLR sequence using the deinterleaver corresponding to the information regarding the power allocation and/or the control information regarding transmission and reception of the target layer.

Conversely, when interleaving has not been performed at the transmission side (S453: NO) but scrambling has been performed at the transmission side (S457: YES), the terminal device 200 (the reception processing unit 243) descrambles the LLR sequence (S459). Specifically, the terminal device 200 descrambles the LLR sequence using the descrambler corresponding to the information regarding the power allocation and/or the control information regarding transmission and reception of the target layer.

The terminal device 200 (the reception processing unit 243) executes error correction coding on the LLR sequence (which has been deinterleaved/scrambled) (S461). For example, the error correction decoding is Viterbi decoding, turbo decoding, MPA decoding or the like.

The terminal device 200 (the reception processing unit 243) performs CRS on the decoded bit sequence (S463). That is, the terminal device 200 checks whether decoding has been correctly performed. Then, the process is ended when all the power layers have been selected (S465: YES) whereas the process returns to step S447 when all of the power layers are not selected (S465: NO).

Meanwhile, although steps S447 to S465 are shown as iterative processes to represent the flowchart, steps S447 to S465 may certainly be executed in parallel for each of the multiple power layers.

(d-3) Generation of Interference Replica

Figure 16:
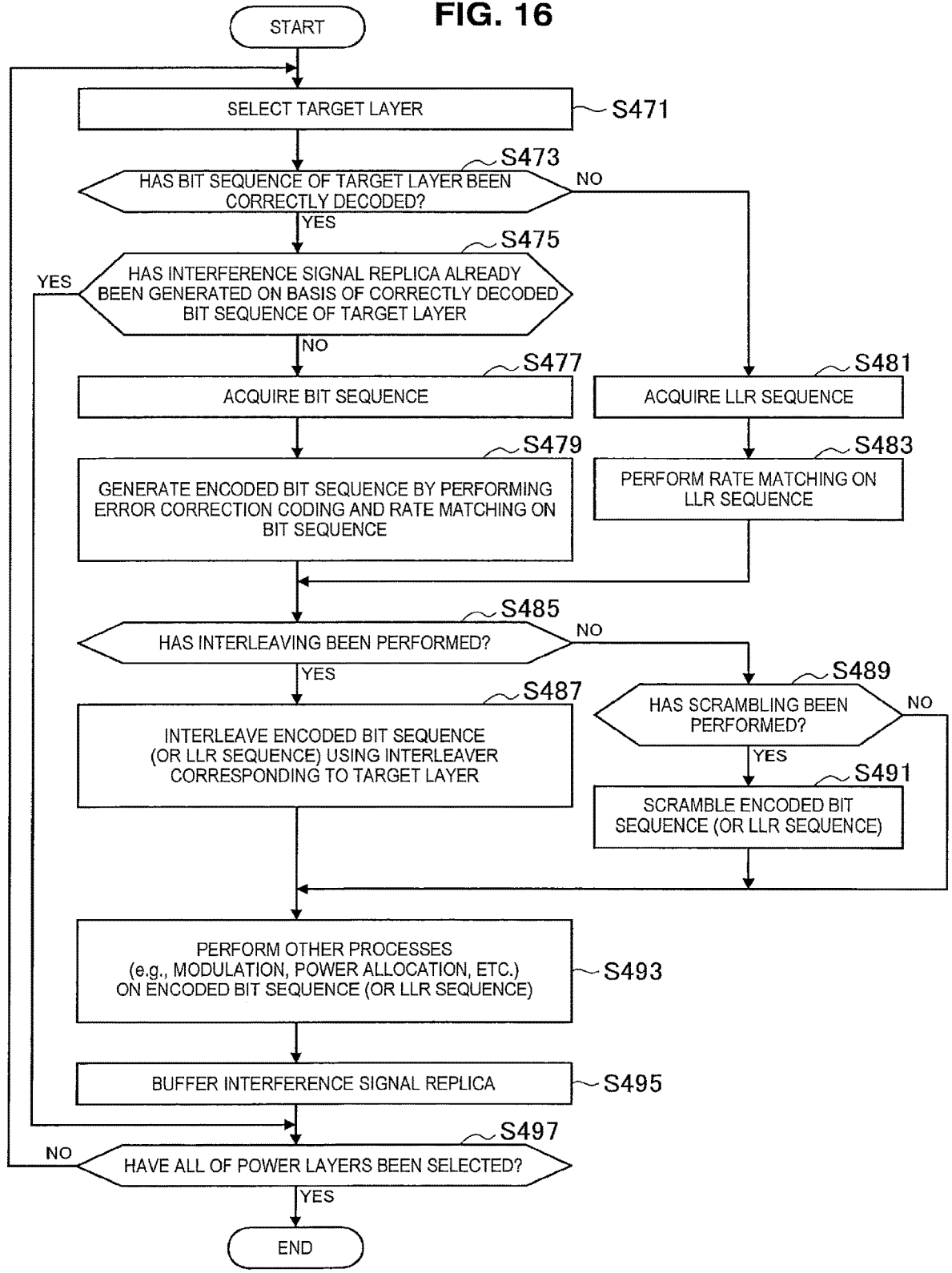
FIG. 16 is a flowchart illustrating an example of a schematic flow of an interference signal replica generation process.

FIG. 16 is a flowchart illustrating an example of a schematic flow of an interference signal replica generation process. The interference signal replica generation process corresponds to step S470 illustrated in FIG. 14.

The terminal device 200 (the reception processing unit 243) selects a target layer from multiple power layers (S471).

When a bit sequence of the target layer has been correctly decoded (S473: YES) but an interference signal replica has not been generated on the basis of the correctly decoded bit sequence of the target layer (S475: NO), the terminal device 200 (the reception processing unit 243) acquires the bit sequence (S477). Then, the terminal device 200 (the reception processing unit 243) performs error correction coding and rate matching on the bit sequence to generate an encoded bit sequence (S449).

When the interference signal replica is already generated on the basis of the correctly decoded bit sequence of the target layer (S475: YES), the process ends when all of the power layers are selected (S497: YES), whereas the process returns to step S471 when all of the power layers are not selected (S497: NO).

When the bit sequence of the target layer has not been correctly decoded (S473: NO), the terminal device 200 (the reception processing unit 243) acquires an LLR sequence (S481) and performs rate matching on the LLR sequence (S483). The LLR sequence is a sequence generated in the error correction decoding process.

Whether the bit sequence of the target layer has been correctly decoded (S473) may be determined on the basis of a result of CRC.

When interleaving has been performed at the transmission side (S485: YES), the terminal device 200 (the reception processing unit 243) interleaves the encoded bit sequence (or the LLR sequence) using an interleaver corresponding to the target layer (S487). Specifically, the terminal device 200 interleaves the encoded bit sequence using the interleaver corresponding to the information regarding the power allocation and/or the control information regarding transmission and reception of the target layer.

Conversely, when interleaving has not been performed at the transmission side (S485: NO) but scrambling has been performed at the transmission side (S489: YES), the terminal device 200 (the reception processing unit 243) scrambles the encoded bit sequence (or the LLR sequence) (S491). Specifically, the terminal device 200 scrambles the encoded bit sequence using the scrambler corresponding to the information regarding the power allocation and/or the control information regarding transmission and reception of the target layer.

The terminal device 200 (the reception processing unit 243) performs other processes (e.g., modulation, power allocation, and the like) on the encoded bit sequence (or the LLR sequence) (which has been interleaved or scrambled) (S493). Then, the terminal device 200 (the reception processing unit 243) buffers the generated interference signal replica (S495). Then, the process ends when all of the power layers are selected (S497: YES), whereas the process returns to step S471 when all of the power layers are not selected (S497: NO).

6. Second Embodiment

The embodiment is a mode in which multicast or broadcast signals are multiplexed using SPC. Hereinafter, the description of the same content as the first embodiment will be omitted and differences from the first embodiment will be mainly described.

<6.1. MBMS>
(1) MBMS

As one of the technologies of LTE, there are known multimedia broadcast/multicast services (MBMS). MBMS is a technology for providing simultaneously services including a video or audio to multiple users by broadcasting or multicasting data. In MBMS, data is transmitted with a physical multicast channel (PMCH). Hereinafter, MBMS will be described with reference to FIG. 17.

Figure 17:
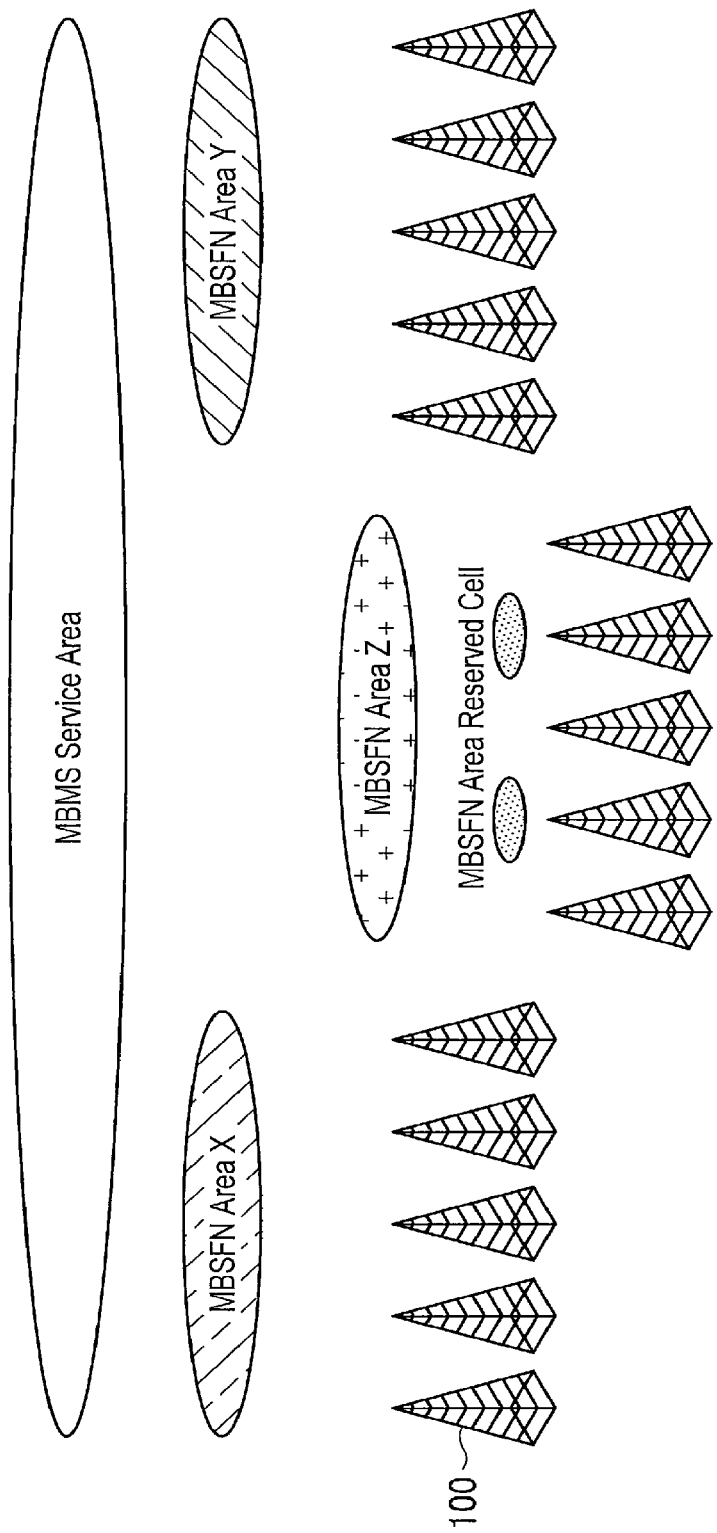
FIG. 17 is an explanatory diagram for explaining an overview of MBMS.

FIG. 17 is an explanatory diagram for explaining an overview of MBMS. As illustrated in FIG. 17, in MBMS, an area (MBMS service area) for providing MBMS can be divided into areas called multimedia broadcast single frequency network (MBSFN) areas. In the same MBSFN area, one or more base stations 100 cooperate to broadcast and multicast the same data to one or more terminal devices 200 in the same area. In the MBSFN area, there is an MBSFN area reserved cell. This cell can provide other services without providing MBMS. Next, the MBSFN area will be described in detail with reference to FIG. 18.

Figure 18:
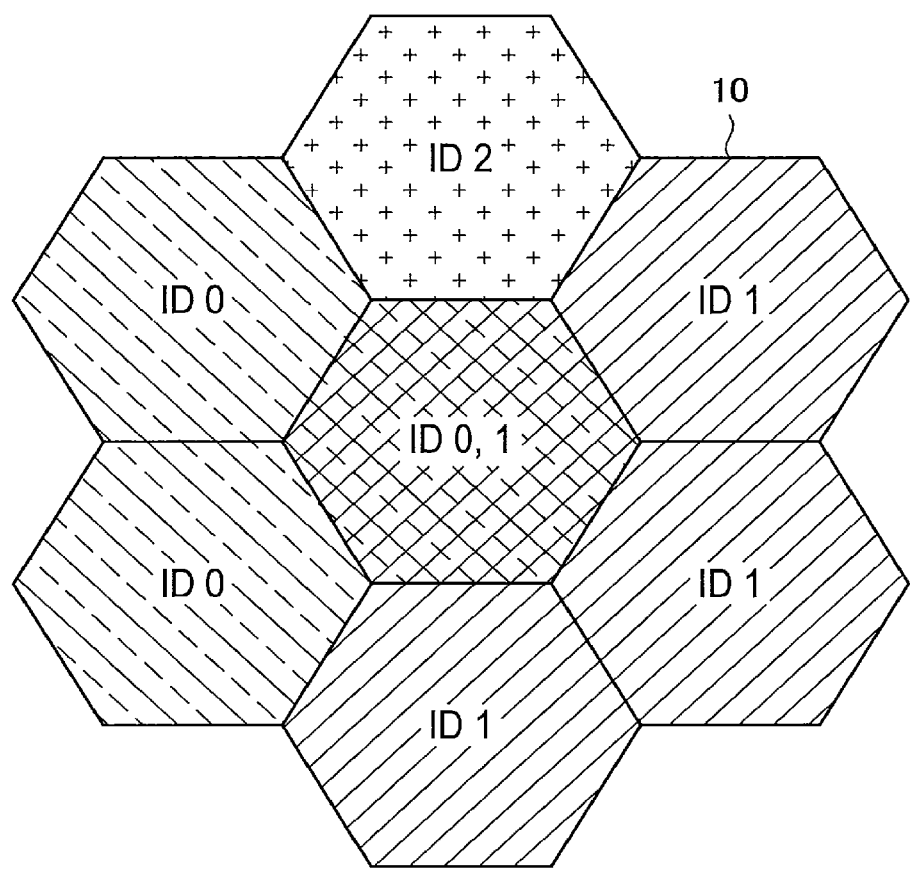
FIG. 18 is an explanatory diagram for explaining an MBSFN area.

FIG. 18 is an explanatory diagram for explaining an MBSFN area. FIG. 18 illustrates an example of a case in which seven cells 10 are separated into three MBSFN areas. IDs=0, 1, and 2 are allocated to the MBSFN areas. The middle cell 10 belongs to both the MBSFN areas with IDs=0 and 1. The ID of the MBSFN area is also called an MBSFN area identify and is also denoted by $N_{ID}^{MBSFN}$. $N_{ID}^{MBSFN}$ takes any one of 0 to 255.

(2) SPC in MBMS

Figure 19:
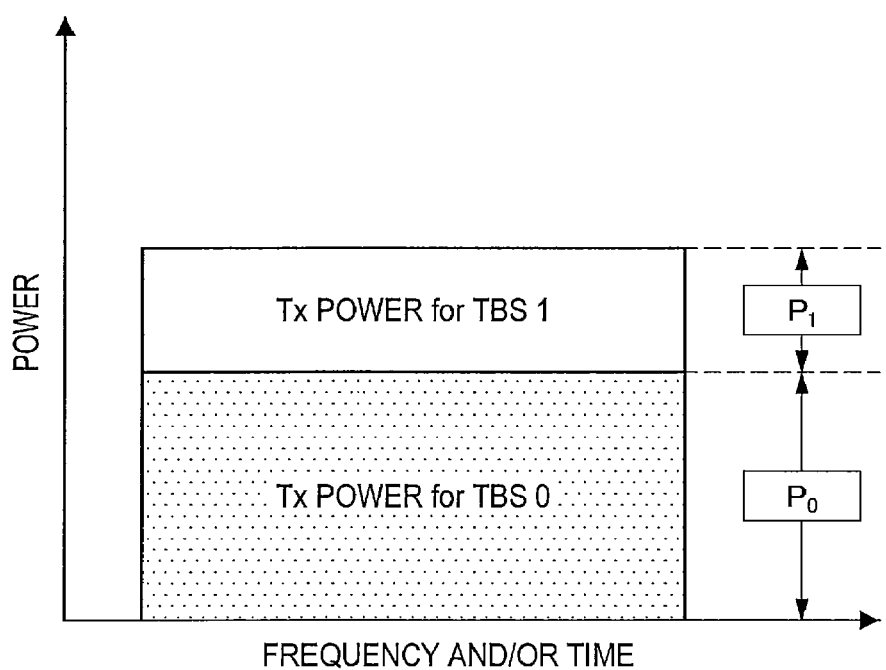
FIG. 19 is an explanatory diagram for explaining an example of power allocation to power layers in MBMS.

In a case in which SPC is adopted in MBMS, multicast or broadcast data is assumed to be multiplexed in a power area on a plurality of or same time resource and/or same frequency resource. An example of a case in which the number of pieces of data is 2 is illustrated in FIG. 19. FIG. 19 is an explanatory diagram for explaining an example of power allocation to power layers in MBMS. As in FIG. 7, the horizontal axis of FIG. 19 represents a frequency resource and/or a time resource and the vertical axis represents a power level (height of the allocated power). As illustrated in FIG. 19, multicast or broadcast transport block sets (TBS) 0 and TBS1 are multiplexed in a power region on the same time resource and/or the same frequency resource.

On a reception side, a desired signal is assumed to be decoded using SIC from signals of a plurality of power areas multiplexed using SPC as in the first embodiment. Here, in order for SIC to appropriately function on the reception side, interference occurring between an interference signal (that is, a signal of another user) and a desired signal is preferably small. Hereinafter, a scramble pattern that has an influence on interference occurring between an interference signal and a desired signal will be described.

In MBMS, a scramble pattern $c^{(q)}(i)$ is uniquely decided using an initial value $C_{init}$ calculated in the following expression.

$$c_{init} = \lfloor n_s/2 \rfloor \cdot 2^9 + N_{ID}^{MBSFN} \quad \text{[Math. 24]}$$

Here, $n_s$ denotes a slot index, $N_{ID}^{MBSFN}$ denotes an ID of an MBSFN area.

Here, in MBMS, the slot indexes $n_s$ of all the data superimposed in the power layers have the same value because of features in which the same data is simultaneously transmitted to users belonging to the same MBMS area. In addition, in MBMS, all the data superimposed in the power layers have the same $N_{ID}^{MBSFN}$ value since the data is superimposed in the power layers and transmitted to the users belonging to the same MBSFN area. That is, in a case in which a scramble scheme of the current standard of deciding a scramble pattern using the foregoing Expression 24 is adopted even at the time of use of SPC, the scramble patterns applied to all the data superimposed in the power layers are the same.

In MBMS, intra-cell interference does not occur since the same data is transmitted to all the users in the same MBSFN area. However, in a case in which data is superimposed in power layers applying SPC in MBMS, interference between the superimposed data, that is, intra-cell interference, can occur. Here, in a case in which the same scramble pattern is applied to all the data in MBMS, the above-described influence of the interference may not be reduced and BLER features degrade in some cases.

Accordingly, in the embodiment, information regarding power allocation is used as in the first embodiment to generate a scramble pattern or an interleave pattern in MBMS. Thus, different scramble patterns or interleave patterns are applied to a plurality of pieces of superimposed data, and thus the above-described influence of the interference can be reduced.

(3) Transmission Process in MBMS

A process of transmitting signals of a plurality of power layers multiplexed using SPC in MBMS is basically the same as the process described in the above-described "«1. SPC»". Hereinafter, the process will be described in detail.

An index of a MBSFN area to be in connection with a target user u is denoted by i, and the total number of transmission antennas of all base stations corresponding to the area is denoted by $N_{TX,i}$. Each of the transmission antennas may also be called a transmission antenna port. A transmission signal of the data $_{nMBMS}$ transmitted from the MBSFN area i to the user u can be expressed in a vector form as below.

$$s_{i,n_{MBMS}} = \begin{bmatrix} s_{i,n_{MBMS},0} \\ \vdots \\ s_{i,n_{MBMS},N_{TX,i}-1} \end{bmatrix} = W_{i,n_{MBMS}} P_{i,n_{MBMS}} x_{i,n_{MBMS}} \quad \text{[Math. 25]}$$

$$W_{i,n_{MBMS}} = \begin{bmatrix} w_{i,n_{MBMS},0,0} & \cdots & w_{i,n_{MBMS},0,N_{SS,n_{MBMS}}-1} \\ \vdots & \ddots & \vdots \\ w_{i,n_{MBMS},N_{TX,i}-1,0} & \cdots & w_{i,n_{MBMS},N_{TX,i}-1,N_{SS,n_{MBMS}}-1} \end{bmatrix} \quad \text{[Math. 26]}$$

$$P_{i,n_{MBMS}} = \begin{bmatrix} P_{i,n_{MBMS},0,0} & \cdots & P_{i,n_{MBMS},0,N_{SS,n_{MBMS}}-1} \\ \vdots & \ddots & \vdots \\ P_{i,n_{MBMS},N_{SS,n_{MBMS}}-1,0} & \cdots & P_{i,n_{MBMS},N_{SS,n_{MBMS}}-1,N_{SS,n_{MBMS}}-1} \end{bmatrix} \quad \text{[Math. 27]}$$

$$x_{i,n_{MBMS}} = \begin{bmatrix} x_{i,n_{MBMS},0} \\ \vdots \\ x_{i,n_{MBMS},N_{TX,i}-1} \end{bmatrix} \quad \text{[Math. 28]}$$

In the above expressions, $N_{SS,\,nMBMS}$ denotes the number of spatial transmission streams for the transmission data $_{nMBMS}$. Basically, $N_{SS,\,nMBMS}$ is a positive integer equal to or less than $N_{TX,i}$. A vector $x_{i,\,nMBMS}$ is a spatial stream signal of the transmission data $_{nMBMS}$. Elements of this vector basically correspond to digital modulation symbols of phase shift keying (PSK), quadrature amplitude modulation (QAM), or the like. A matrix $W_{i,n_{MBMS}}$ is a precoding matrix for the transmission data $n_{MBMS}$. An element in this matrix is basically a complex number, but may be a real number.

A matrix $P_{i,n_{MBMS}}$ is a power allocation coefficient matrix for the transmission data $n_{MBMS}$ in the MBSFN area i. In this matrix, each element is preferably a positive real number. Note that this matrix may be a diagonal matrix (i.e., a matrix whose components excluding diagonal components are zero) as below.

$$P_{i,n_{MBMS}} = \begin{bmatrix} P_{i,n_{MBMS},0,0} & 0 & \cdots & 0 \\ 0 & P_{i,n_{MBMS},1,1} & \ddots & \vdots \\ \vdots & \ddots & \ddots & 0 \\ 0 & \cdots & 0 & P_{i,n_{MBMS},N_{SS,n_{MBMS}}-1,N_{SS,n_{MBMS}}-1} \end{bmatrix}$$ [Math. 29]

If adaptive power allocation for a spatial stream is not performed, a scalar value $P_{i,u}$ may be used instead of the matrix $P_{i,n_{MBMS}}$.

Not only the transmission data $n_{MBMS}$ but also the following another signal in Math. 31 including the following transmission data in Math. 30 are transmitted with the same radio resources to the MBSFN area i.

$$\tilde{n}_{MBMS}$$ [Math. 30]

$$s_{i,\tilde{n}_{MBMS}}$$ [Math. 31]

The signal is multiplexed using the SPC. A signal $s_i$ from the MBSFN area i after the multiplexing is expressed as follows.

$$s_i = \sum_{n=0}^{N_{MBMS}-1} s_{i,n}$$ [Math. 32]

In the above-described expression, $N_{MBMS}$ is a total number of transmission data multiplexed in the MBSFN area i. Even in an area j (an area which is an interference source to the area i) other than the MBSFN area i, a transmission signal $s_j$ is similarly generated. The signal is received as interference on the user side. A reception signal $r_u$ of a user u can be expressed as follows.

$$r_u = \begin{bmatrix} r_{u,0} \\ \vdots \\ r_{u,N_{RX,u}-1} \end{bmatrix} = \sum_{i'} H_{u,i'} s_{i'} + n_u$$ [Math. 33]

$$H_{u,i} = \begin{bmatrix} h_{u,i,0,0} & \cdots & h_{u,i,0,N_{TX,i}-1} \\ \vdots & \ddots & \vdots \\ h_{u,i,N_{RX,u}-1,0} & \cdots & h_{u,i,N_{RX,u}-1,N_{TX,i}-1} \end{bmatrix}$$ [Math. 34]

$$n_u = \begin{bmatrix} n_{u,0} \\ \vdots \\ n_{u,N_{RX,u}-1} \end{bmatrix}$$ [Math. 35]

In the above expressions, a matrix $H_{u,i}$ is a channel response matrix for the MBSFN area i and the user u. Each element of the matrix $H_{u,i}$ is basically a complex number. A vector $n_u$ is noise included in the reception signal $r_u$ of the user u. For example, the noise includes thermal noise and interference from another system. The average power of the noise is expressed as below.

$$r_u = H_{u,i} s_{i,n_{MBMS}} + H_{u,i} \sum_{n=0, n \neq n_{MBMS}}^{N_{MBMS}} s_{i,n} + \sum_{j \neq i} H_{u,j} \sum_{\tilde{n}=0}^{\tilde{N}_{MBMS}} s_{j,\tilde{n}} + n_u$$ [Math. 36]

In the above expression, the first term of the right side denotes a desired signal of the user u, the second term, interference in the serving cell i of the user u (called intra-cell interference or multi-access interference, or the like), and the third term, interference from an area other than the area i (called inter-cell interference).

<6.2. Technical Features>

(1) Technical Features on Transmission Side

The base station 100 (for example, the transmission processing unit 151) according to the embodiment applies signal conversion processes with different patterns to a plurality of pieces of transmission data (the physical channel PMCH) multiplexed using SPC. Thus, since different signal conversion processes are applied to a plurality of pieces of superimposed data, the influence of the interference can be reduced.

The base station 100 adds, for example, information regarding power allocation to parameters for generating a scramble pattern. The following Table 2 shows examples of parameters available to generate the scramble pattern.

TABLE 8

| | parameters | SPC not applied | SPC applied |
|---|---|---|---|
| Information regarding MBMS | Slot Index | ○ | ○ |
| | MBSFN Area Identify | ○ | ○ |
| Information regarding power allocation | Power Layer Index | — | ○ |
| | Power Table Index | — | ○ |
| | Power Allocation Rate | — | ○ |

The information regarding MBMS shown in the foregoing Table 8 is parameters available to generate the scramble pattern in MBMS, as expressed in the foregoing Expression 24. Further, the slot index is equivalent to a subframe index in the foregoing Table 1. As shown in the foregoing Table 8, in a case in which SPC is not applied, the base station 100 generates the scramble pattern using the information regarding MBMS. Conversely, when SPC is applied, the base station 100 uses at least one of the information regarding the power allocation as a parameter for generating the scramble pattern in addition to the information regarding MBMS. Hereinafter, the information regarding the power allocation will be described in detail.

Power Layer Index

The base station 100 may generate the scramble pattern using the power layer index of the scramble target transmission signal sequence in addition to the information regarding MBMS (that is, the slot index and the area ID of the MBSFN).

The power layer index according to the embodiment is the same as the power layer index described above with reference to FIG. 7. In the embodiment, the total number $N_{MBMS}$ of transmission data multiplexed in a target MBSFN area is equivalent to the number of power layers N and the index $n_{MBMS}$ of the transmission data is equivalent to the power layer index. For example, as the index is smaller, a higher power level is allocated to the indexes $n_{MBMS}=0$ to $N_{MBMS}-1$ of the power layers. Of course, the relation between the power layer index and the allocated power level is not limited thereto.

The initial value $c_{init}$ of the scramble pattern generated using the power layer index is expressed in the following expression, for example.

$$c_{init}=n_{MBMS}\cdot 2^{10}+\lfloor n_s/2 \rfloor \cdot 2^9+N_{ID}^{MBSFN} \quad \text{[Math. 37]}$$

Power Table Index

The base station 100 may generate the scramble pattern using the power table index of the scramble target transmission signal sequence in addition to the information regarding MBMS (that is, the slot index and the area ID of MBSFN). An example of the power table index has been described in the foregoing Table 2. The initial value $c_{init}$ of the scramble pattern generated using the power table index is expressed in the following expression, for example.

$$c_{init}=P_{TBI}\cdot 2^{10}+\lfloor n_s/2 \rfloor \cdot 2^9+N_{ID}^{MBSFN} \quad \text{[Math. 38]}$$

Power Allocation Rate

The base station 100 may generate the scramble pattern using the information indicating a value of power allocated to a target power layer (for example, a power allocation rate) in addition to the information regarding MBMS (that is, the slot index and the area ID of MBSFN). An example of the power allocation rate has been described in the foregoing Table 3. The initial value $c_{init}$ of the scramble pattern generated using the power allocation rate is expressed in the following expression, for example.

$$c_{init}=P_{Rate}\cdot 2^{10}+\lfloor n_s/2 \rfloor \cdot 2^9+N_{ID}^{MBSFN} \quad \text{[Math. 39]}$$

(Supplement)

The example in which the information regarding the power allocation is added to the parameters for generating the scramble pattern has been described above, but the present technology is not limited to this example. For example, the scramble pattern may be generated on the basis of the slot index and the area ID of MBSFN as in the related art and the signal conversion processes based on the information regarding the power allocation may be performed on a scramble output sequence or a scramble input sequence. Even in this case, since the different signal conversion processes are applied to the plurality of pieces of superimposed data, the influence of the interference can be reduced.

As an example of the signal conversion process, an interleaver can be exemplified. For example, the interleave pattern is generated on the basis of the above-described information regarding the power allocation and the different interleave patterns are applied to the multiplexed signals. Of course, the information regarding the power allocation may be used in both the generation of the scramble pattern and the signal conversion process.

As parameter notification means, the same means as the means described in the first embodiment is used. In the embodiment, however, the control information can be notified of with the control channel physical multicast control channel (PMCH) used in MBMS.

(2) Technical Features on Reception Side

The terminal device 200 (the reception processing unit 243) has the features described in the first embodiment. The reception process by the terminal device 200 is the same as the process described above with reference to FIG. 9 and the like. However, the terminal device 200 according to the embodiment is different from that according to the first embodiment in that the process of confirming whether the radio resources are allocated to the terminal device 200 (FIG. 9: step S323) and the process of responding ACK/NACK (FIG. 9: step S327) are not performed.

(3) Conclusion

The technical features according to the embodiment have been described above. According to the embodiment, in a case in which the multicast or broadcast data is multiplexed in the power area on the plurality of or same time resource and/or same frequency resource, the signal conversion patterns applied to the multiplexed signals can be set to be different. Thus, the error rate feature on the reception side can be improved.

7. Modified Example

In the modified examples, CRC scrambling in accordance with the information regarding the power allocation is performed.

(1) Standard Specification of CRC Scrambling

For example, in the case of the physical downlink control channel (PDCCH), the CRC scrambling is performed in the CRC encoding block illustrated in FIG. 2. A CRC scrambling target sequence is expressed in the following expression.

$$b_0, b_1, b_2, b_3, \ldots, b_{B-1}=a_0, a_1, a_2, a_3, \ldots, a_{A-1},$$
$$p_0, p_1, p_2, p_3, \ldots, p_{L-1} \quad \text{[Math. 40]}$$

Here, $a_0, \ldots, a_{A-1}$ is a transmission target bit stream and A denotes the size of the transmission target bit stream. The bit stream is also called a payload bit sequence below. In addition, $p_0, \ldots, p_{L-1}$ denote a payload bit sequence corresponding to the payload bit sequence and L denotes the size of the payload bit sequence. Hereinafter, the payload bit sequence is also called a CRC bit sequence. In addition, $b_0, \ldots, b_{B-1}$ denote a bit sequence in which the payload bit sequence and the CRC bit sequence are connected and B denotes the size of the bit sequence. That is, B=A+L is satisfied.

The standard specification of the CRC scramble is defined in 3GPP TS36.212. More specifically, the CRC bit sequence is scrambled using RNTI as expressed in the following expression.

$$c_k=b_k \text{ for } k=0, 1, 2, \ldots, A-1$$
$$c_k=(b_k+x_{rnti,k-A}) \bmod 2 \text{ for } k=A, A+1, A+2, \ldots, A+15 \quad \text{[Math. 41]}$$

Here, $b_k$ in k=A, ..., A+15 is equivalent to the CRC bit sequence. In addition, $x_{rnti, k-A}$ denotes a bit sequence of RNTI. In addition, $c_k$ is a scrambled bit sequence. The bit sequence is output from the CRC encoding block illustrated in FIG. 2 and is input to an FEC encoding block. Accordingly, the bit sequence is also called an FEC encoding input bit sequence.

(2) CRC Scrambling in Accordance with Information Regarding Power Allocation

In the modified example, to generate the FEC encoding input bit sequence, the following expression is adopted instead of the foregoing expression.

$$c_k=b_k \text{ for } k=0, 1, 2, \ldots, A-1$$
$$c_k=(b_k+x_{rnti,k-A}+x_{PowerAlloc,k-A}) \bmod 2 \text{ for } k=A, A+1, A+2, \ldots, A+15 \quad \text{[Math. 42]}$$

Here, $x_{PowerAlloc, k-A}$ is a bit sequence corresponding to the information regarding the power allocation. An example of the bit sequence corresponding to the information regarding the power allocation is shown in the following table.

TABLE 9

| UE Transmit Power Alloc. | Power Alloc mask <$x_{PowerAlloc, 0}$, $x_{PowerAlloc, 1}$, ..., $x_{PowerAlloc, 15}$> | Power Layer 0 ratio | Power Layer 1 ratio |
|---|---|---|---|
| UE Transmit Power Alloc. 0 | <0, 0, 0, 0, 0, 0, 0, 0, 0, 0, 0, 0, 0, 0, 0, 0> | not multiplexed on power axis | |
| UE Transmit Power Alloc. 1 | <1, 0, 0, 0, 0, 0, 0, 0, 0, 0, 0, 0, 0, 0, 0, 0> | A % | 100 - A % |
| UE Transmit Power Alloc. 2 | <0, 1, 0, 0, 0, 0, 0, 0, 0, 0, 0, 0, 0, 0, 0, 0> | B % | 100 - B % |
| UE Transmit Power Alloc. 3 | <1, 1, 0, 0, 0, 0, 0, 0, 0, 0, 0, 0, 0, 0, 0, 0> | C % | 100 - C % |

"UE transmit power Alloc." denotes an index regarding the information regarding the power allocation. "Power Alloc mask" denotes a bit sequence corresponding to the information regarding the power allocation. "Power Layer 0 ratio" is a power allocated to power layer 0. "Power Layer 1 ratio" is a power allocated to power layer 1.

Further, A, B, and C in "Power Layer 0 ratio" and "Power Layer 1 ratio" are any numerical values greater than 0 and less than 100.

In this way, the CRC bit sequence is scrambled in accordance with the information regarding the power allocation.

8. Application Example

The technology of the present disclosure can be applied to various products. The base station 100 may be realized as any type of evolved node B (eNB), for example, a macro eNB, a small eNB, or the like. A small eNB may be an eNB that covers a smaller cell than a macro cell, such as a pico eNB, a micro eNB, or a home (femto) eNB. Alternatively, the base station 100 may be realized as another type of base station such as a node B or a base transceiver station (BTS). The base station 100 may include a main body that controls radio communication (also referred to as a base station device) and one or more remote radio heads (RRHs) disposed in a different place from the main body. In addition, various types of terminals to be described below may operate as the base station 100 by temporarily or semi-permanently executing the base station function. Furthermore, at least some of constituent elements of the base station 100 may be realized in a base station device or a module for a base station device.

In addition, the terminal device 200 may be realized as, for example, a mobile terminal such as a smartphone, a tablet personal computer (PC), a notebook PC, a portable game terminal, a portable/dongle type mobile router, or a digital camera, or an in-vehicle terminal such as a car navigation device. In addition, the terminal device 200 may be realized as a terminal that performs machine-to-machine (M2M) communication (also referred to as a machine type communication (MTC) terminal). Furthermore, at least some of constituent elements of the terminal device 200 may be realized in a module mounted in such a terminal (for example, an integrated circuit module configured in one die).

<8.1. Application Example with Regard to Base Station>

First Application Example

Figure 20:
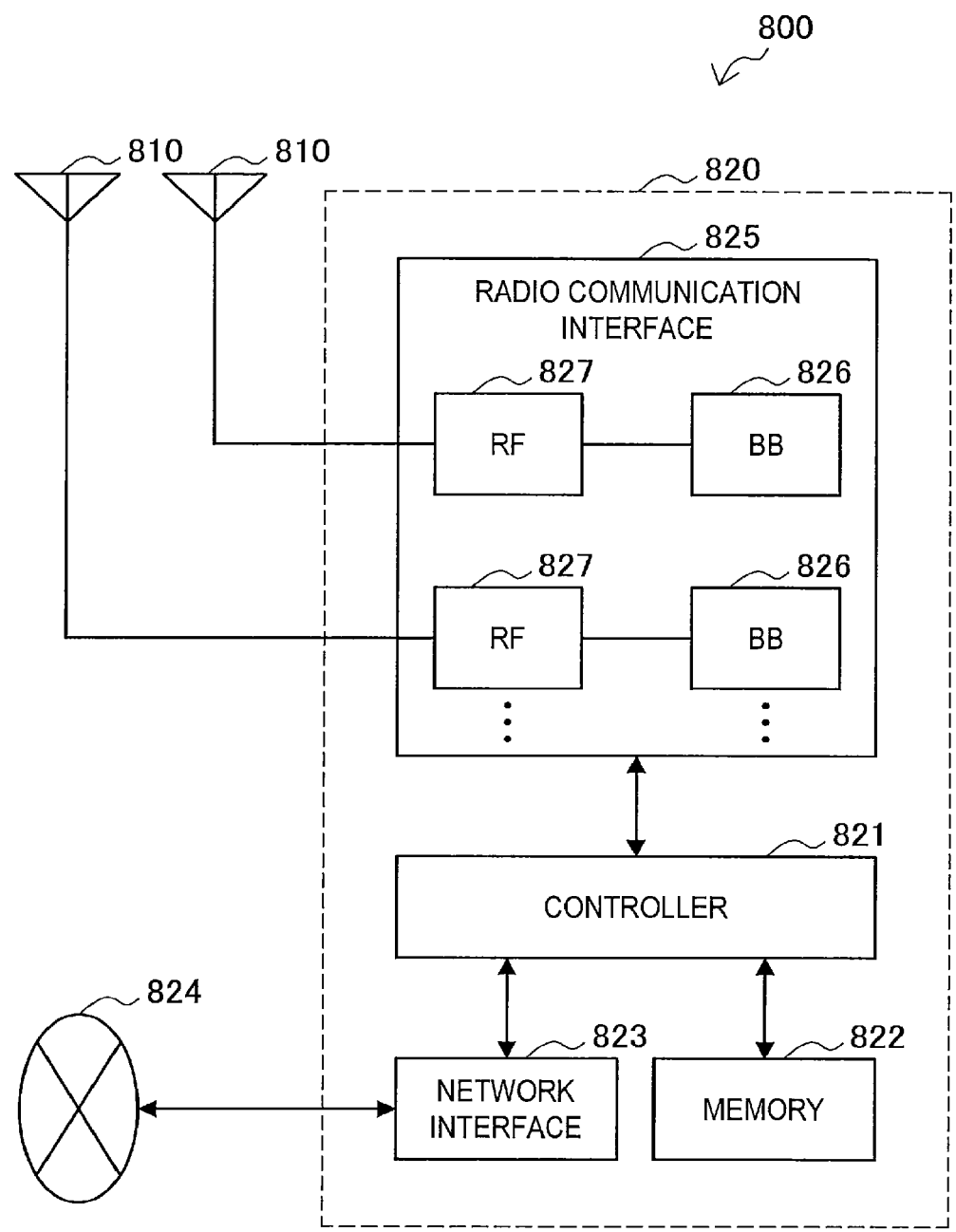
FIG. 20 is a block diagram illustrating a first example of a schematic configuration of an eNB.

FIG. 20 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 20. For example, the multiple antennas 810 may be compatible with multiple frequency bands used by the eNB 800. Although FIG. 20 illustrates the example in which the eNB 800 includes the multiple antennas 810, the eNB 800 may also include a single antenna 810.

The base station device 820 includes a controller 821, a memory 822, a network interface 823, and a radio communication interface 825.

The controller 821 may be, for example, a CPU or a DSP, and operates various functions of a higher layer of the base station device 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In this case, the eNB 800 may be connected to a core network node or another eNB through a logical interface (e.g. S1 interface or X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 20. For example, the multiple BB processors 826 may be compatible with multiple frequency bands used by the eNB 800. The radio communication interface 825 may include the multiple RF circuits 827, as illustrated in FIG. 20. For example, the multiple RF circuits 827 may be compatible with multiple antenna elements. Although FIG. 20 illustrates the example in which the radio communication interface 825 includes the multiple BB processors 826 and the multiple RF circuits 827, the radio communication interface 825 may also include a single BB processor 826 or a single RF circuit 827.

In the eNB 800 shown in FIG. 20, one or more structural elements included in the processing unit 150 (the transmission processing unit 151 and/or the notification unit 153) described with reference to FIG. 5 may be implemented by the radio communication interface 825. Alternatively, at least some of these constituent elements may be implemented by the controller 821. As an example, a module which includes a part (for example, the BB processor 826) or all of the radio communication interface 825 and/or the controller 821 may be mounted in eNB 800, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 800, and the radio communication interface 825 (for example, the BB processor 826) and/or the controller 821 may execute the program. As described above, the eNB 800, the base station device 820, or the module may be provided as a device which includes the one or more structural elements, and the program for causing the processor to function as the one or more structural elements may be provided. In addition, a readable recording medium in which the program is recorded may be provided.

In addition, in the eNB 800 shown in FIG. 20, the radio communication unit 120 described with reference to FIG. 5 may be implemented by the radio communication interface 825 (for example, the RF circuit 827). Moreover, the antenna unit 110 may be implemented by the antenna 810. In addition, the network communication unit 130 may be implemented by the controller 821 and/or the network interface 823. Further, the storage unit 140 may be implemented by the memory 822.

Second Application Example

Figure 21:
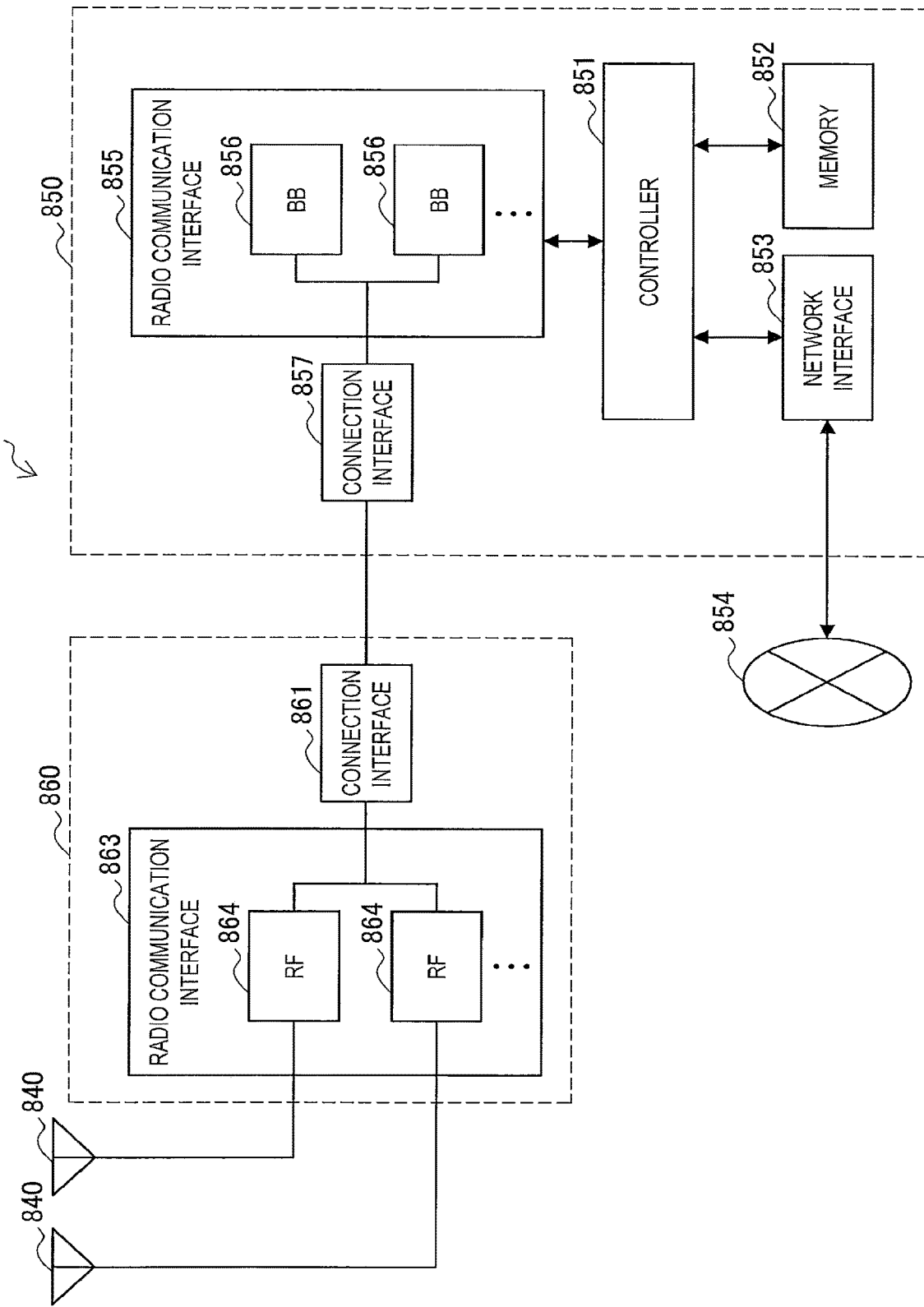
FIG. 21 is a block diagram illustrating a second example of the schematic configuration of the eNB.

FIG. 21 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 21. For example, the multiple antennas 840 may be compatible with multiple frequency bands used by the eNB 830. Although FIG. 21 illustrates the example in which the eNB 830 includes the multiple antennas 840, the eNB 830 may also include a single antenna 840.

The base station device 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 20.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 20, except the BB processor 856 is connected to the RF circuit 864 of the RRH 860 via the connection interface 857. The radio communication interface 855 may include the multiple BB processors 856, as illustrated in FIG. 21. For example, the multiple BB processors 856 may be compatible with multiple frequency bands used by the eNB 830. Although FIG. 21 illustrates the example in which the radio communication interface 855 includes the multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication in the above-described high speed line that connects the base station device 850 (radio communication interface 855) to the RRH 860

The RRH 860 includes a connection interface 861 and a radio communication interface 863.

The connection interface 861 is an interface for connecting the RRH 860 (radio communication interface 863) to the base station device 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 21. For example, the multiple RF circuits 864 may support multiple antenna elements. Although FIG. 21 illustrates the example in which the radio communication interface 863 includes the multiple RF circuits 864, the radio communication interface 863 may also include a single RF circuit 864.

In the eNB 830 shown in FIG. 21, one or more structural elements included in the processing unit 150 (the transmission processing unit 151 and/or the notification unit 153) described with reference to FIG. 5 may be implemented by the radio communication interface 855 and/or the radio communication interface 863. Alternatively, at least some of these constituent elements may be implemented by the controller 851. As an example, a module which includes a part (for example, the BB processor 856) or all of the radio communication interface 855 and/or the controller 851 may be mounted in eNB 830, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 830, and the radio communication interface 855 (for example, the BB processor 856) and/or the controller 851 may execute the program. As described above, the eNB 830, the base station device 850, or the module may be provided as a device which includes the one or more structural elements, and the program for causing the processor to function as the one or more structural elements may be provided. In addition, a readable recording medium in which the program is recorded may be provided.

Figure 5:
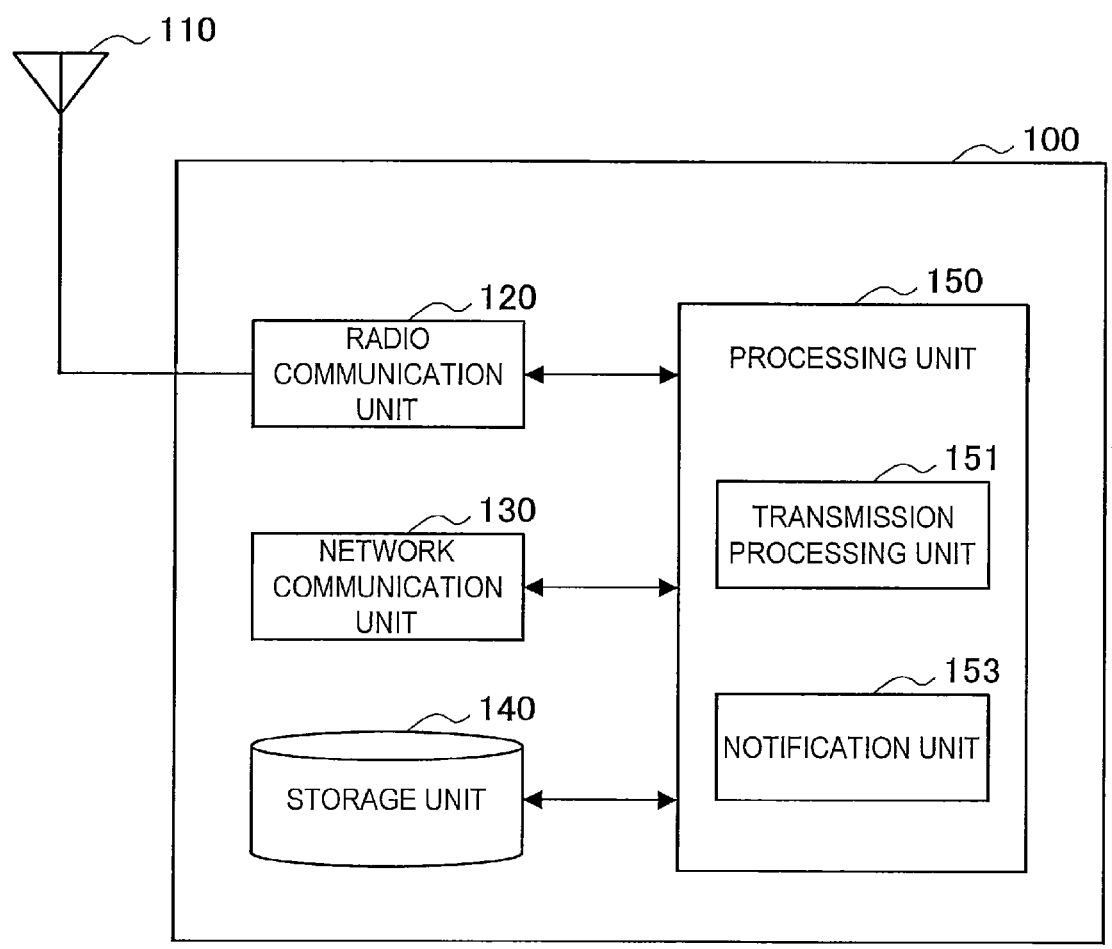
FIG. 5 is a block diagram illustrating an example of a configuration of a base station according to the embodiment of the present disclosure.

In addition, in the eNB 830 shown in FIG. 21, the radio communication unit 120 described, for example, with reference to FIG. 5 may be implemented by the radio communication interface 863 (for example, the RF circuit 864). Moreover, the antenna unit 110 may be implemented by the antenna 840. In addition, the network communication unit 130 may be implemented by the controller 851 and/or the network interface 853. Further, the storage unit 140 may be implemented by the memory 852.

<8.2. Application Example with Regard to Terminal Device>

First Application Example

Figure 22:
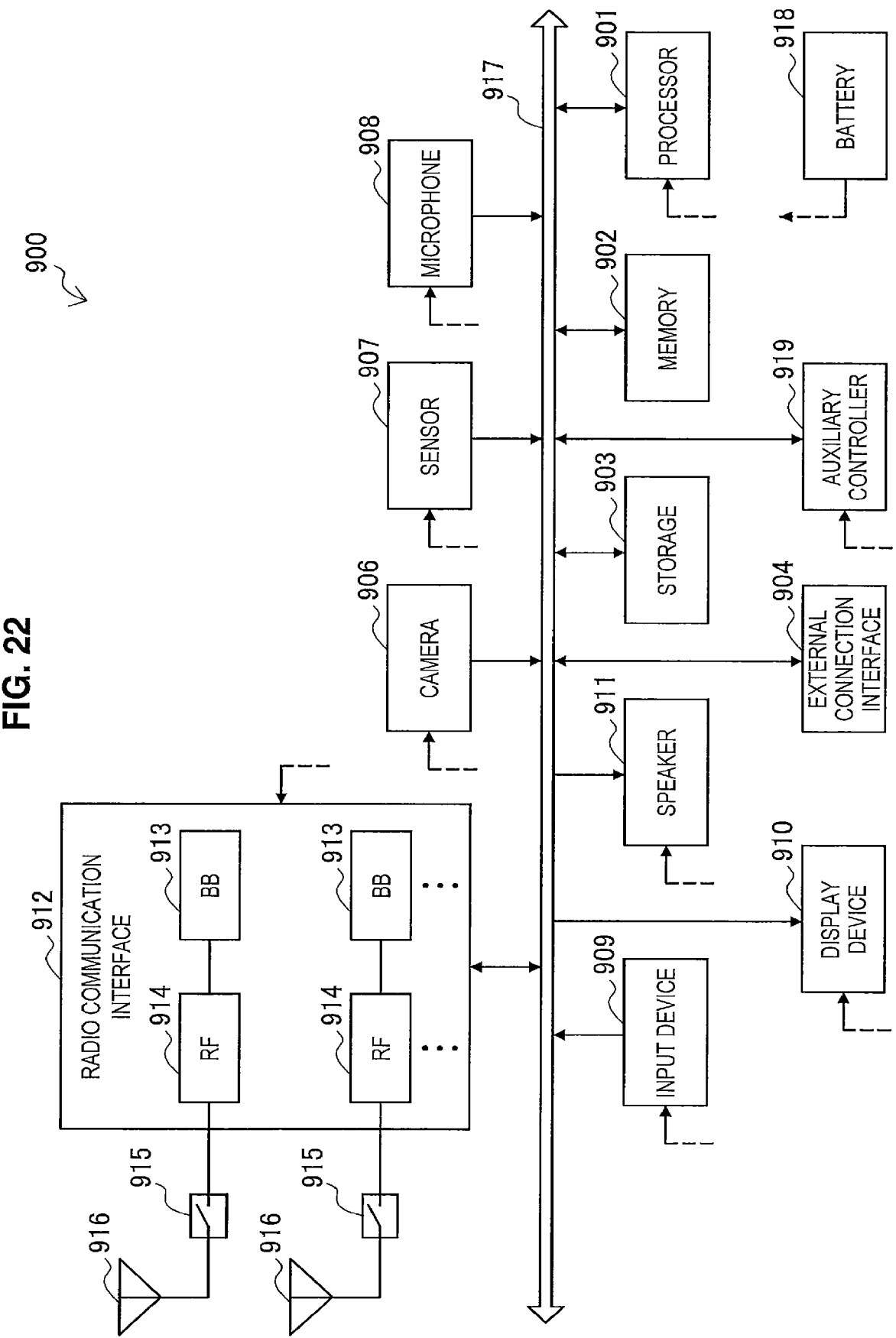
FIG. 22 is a block diagram illustrating an example of a schematic configuration of a smartphone.

FIG. 22 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 22. Although FIG. 22 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 22. Although FIG. 22 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 22 via feeder lines, which are partially shown as dashed lines in the figure. The auxiliary controller 919 operates a minimum necessary function of the smartphone 900, for example, in a sleep mode.

In the smartphone 900 shown in FIG. 22, one or more constituent elements included in the processing unit 240 (the acquisition unit 241 and/or the reception processing unit 243) described with reference to FIG. 6 may be implemented by the radio communication interface 912. Alternatively, at least some of these constituent elements may be implemented by the processor 901 or the auxiliary controller 919. As an example, a module which includes a part (for example, the BB processor 913) or all of the radio communication interface 912, the processor 901 and/or the auxiliary controller 919 may be mounted in the smartphone 900, and the one or more constituent elements may be implemented by the module. In this case, the module may store a program for causing the processor to function as the one or more constituent elements (i.e., a program for causing the processor to execute operations of one or more constituent elements) and may execute the program. As another example, the program for causing the processor to function as the one or more constituent elements may be installed in the smartphone 900, and the radio communication interface 912 (for example, the BB processor 913), the processor 901 and/or the auxiliary controller 919 may execute the program. As described above, the smartphone 900 or the module may be provided as a device which includes the one or more constituent elements, and the program for causing the processor to function as the one or more constituent elements may be provided. In addition, a readable recording medium in which the program is recorded may be provided.

Figure 6:
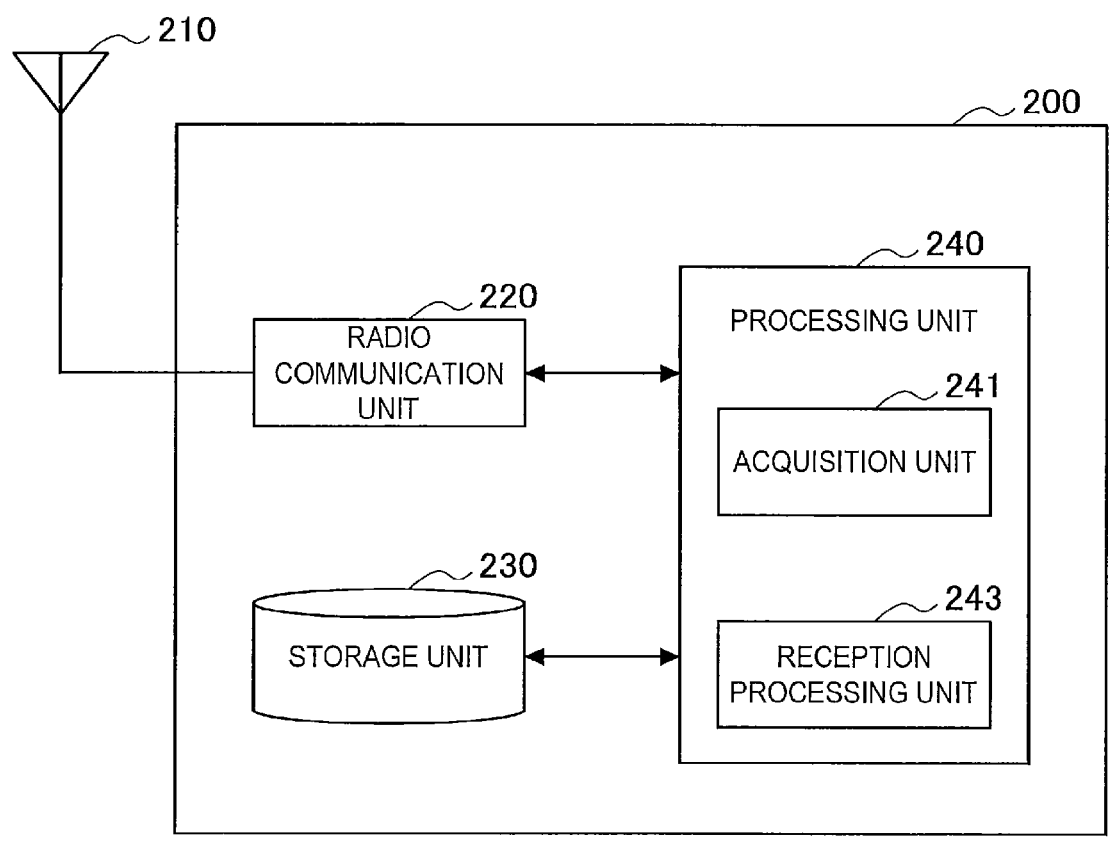
FIG. 6 is a block diagram illustrating an example of a configuration of a terminal device according to the embodiment of the present disclosure.

In addition, in the smartphone 900 shown in FIG. 22, the radio communication unit 220 described, for example, with reference to FIG. 6 may be implemented by the radio communication interface 912 (for example, the RF circuit 914). Moreover, the antenna unit 210 may be implemented by the antenna 916. Further, the storage unit 230 may be implemented by the memory 902.

Second Application Example

Figure 23:
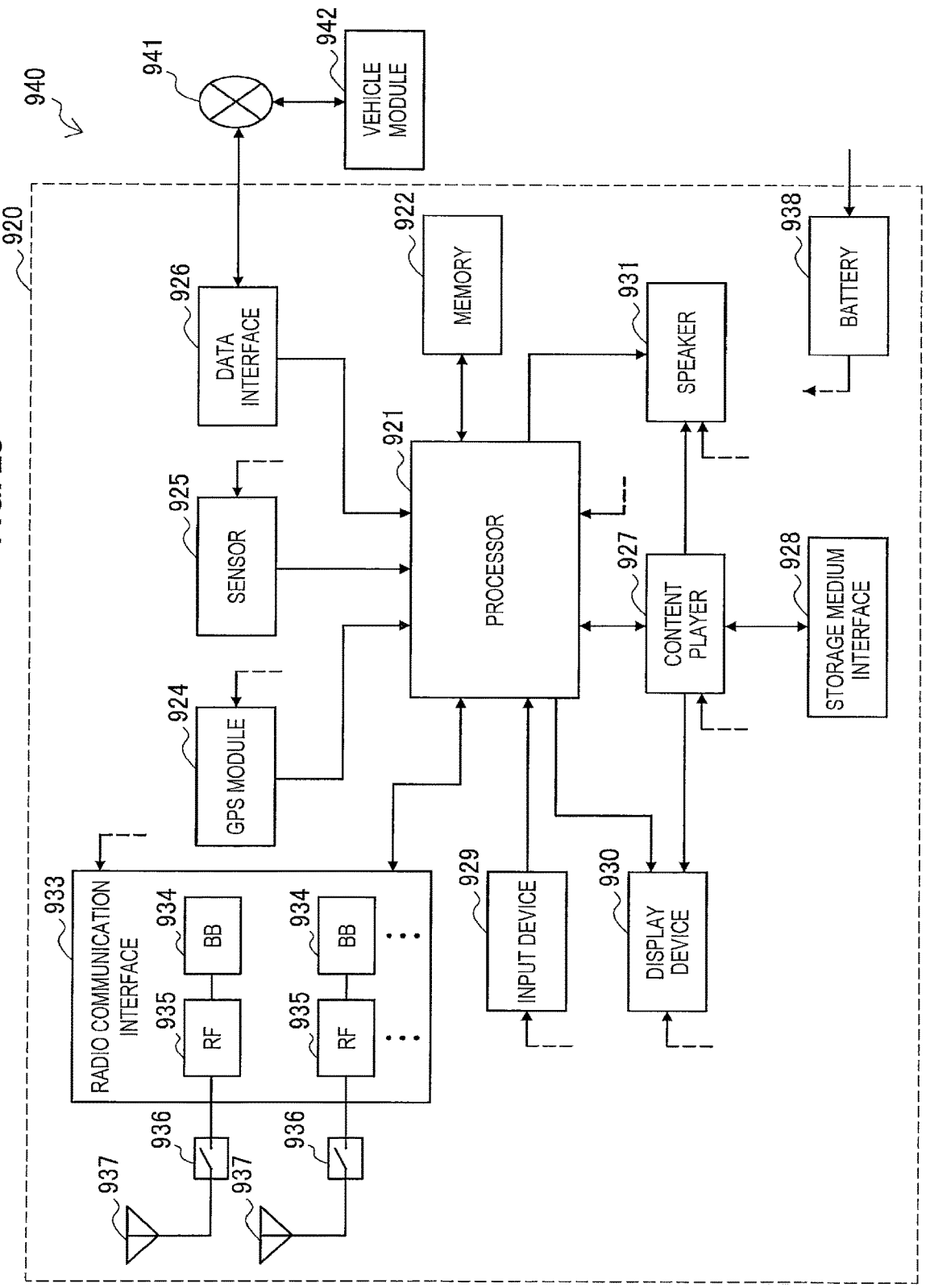
FIG. 23 is a block diagram illustrating an example of a schematic configuration of a car navigation device.

FIG. 23 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 23. Although FIG. 23 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation device 920 may include the multiple antennas 937, as illustrated in FIG. 23. Although FIG. 23 illustrates the example in which the car navigation device 920 includes the multiple antennas 937, the car navigation device 920 may also include a single antenna 937.

Furthermore, the car navigation device 920 may include the antenna 937 for each radio communication scheme. In that case, the antenna switches 936 may be omitted from the configuration of the car navigation device 920.

The battery 938 supplies power to blocks of the car navigation device 920 illustrated in FIG. 23 via feeder lines that are partially shown as dashed lines in the figure. The battery 938 accumulates power supplied form the vehicle.

In the car navigation device 920 shown in FIG. 23, one or more constituent elements included in the processing unit 240 (the acquisition unit 241 and/or the reception processing unit 243) described with reference to FIG. 6 may be implemented by the radio communication interface 933. Alternatively, at least some of these constituent elements may be implemented by the processor 921. As an example, a module which includes a part (for example, the BB processor 934) or all of the radio communication interface 933 and/or the processor 921 may be mounted in the car navigation device 920, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the one or more constituent elements may be installed in the car navigation device 920, and the radio communication interface 933 (for example, the BB processor 934) and/or the processor 921 may execute the program. As described above, the car navigation device 920 or the module may be provided as a device which includes the one or more constituent elements, and the program for causing the processor to function as the one or more constituent elements may be provided. In addition, a readable recording medium in which the program is recorded may be provided.

In addition, in the car navigation device 920 shown in FIG. 23, the radio communication unit 220 described, for example, with reference to FIG. 6 may be implemented by the radio communication interface 933 (for example, the RF circuit 935). Moreover, the antenna unit 210 may be implemented by the antenna 937. Further, the storage unit 230 may be implemented by the memory 922.

The technology of the present disclosure may also be realized as an in-vehicle system (or a vehicle) 940 including one or more blocks of the car navigation device 920, the in-vehicle network 941, and a vehicle module 942. In other words, the in-vehicle system (or a vehicle) 940 may be provided as a device which includes the acquisition unit 241 and/or the reception processing unit 243. The vehicle module 942 generates vehicle data such as vehicle speed, engine speed, and trouble information, and outputs the generated data to the in-vehicle network 941.

9. Conclusion

So far, an embodiment of the present disclosure have been described in detail with reference to FIGS. 1 to 23.

As described above, the base station 100 according to the embodiment sets each of the transmission signal sequences of the plurality of power layers multiplexed using the power allocation in the allocated spatial layers as a target and applies at least one of the scrambler using the scramble pattern and the interleaver using the interleave pattern corresponding to the information regarding the power allocation. By applying the scrambler and/or the interleaver corresponding to the information regarding the power allocation, it is possible to reduce the control signal used to notify of the parameters necessary for pattern generation.

In addition, the base station 100 according to the embodiment may apply at least one of the scrambler using the scramble pattern and the interleaver using the interleave pattern corresponding to the information regarding the power allocation and the control information regarding transmission and reception of the transmission signal sequence. Thus, an improvement in the error rate feature is expected.

Thus, under an environment in which the multiplexing is performed using the power allocation, an interference signal replica in less signaling overheads can be generated.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, although examples using techniques of existing systems such as LTE, LTE-A, and the like have been described with respect to communication of the base station and the terminal device, the present disclosure is certainly not limited to such examples. A technique of a new system may be used.

In addition, for example, although the base station is a transmission device and the terminal device is a reception device with respect to multiplexing using power allocation, the present disclosure is not limited to such an example. The transmission device and the reception device may be other devices.

In addition, processing steps in processes of the present specification may not necessarily be executed in, for example, a time series manner in the order described in the flowcharts or sequence diagrams. The processing steps in the processes may also be executed in, for example, a different order from the order described in the flowcharts or sequence diagrams, or may be executed in parallel.

In addition, a computer program for causing a processor (for example, a CPU, a DSP, or the like) provided in a device of the present specification (for example, a base station, a base station device or a module for a base station device, or a terminal device or a module for a terminal device) to function as a constituent element of the device (for example, the transmission processing unit 151 and/or the notification unit 153, or the like) (in other words, a computer program for causing the processor to execute operations of the constituent element of the device) can also be created. In addition, a recording medium in which the computer program is recorded may also be provided. Further, a device that includes a memory in which the computer program is stored and one or more processors that can execute the computer program (a base station, a base station device or a module for a base station device, or a terminal device or a module for a terminal device) may also be provided. In addition, a method including an operation of the constituent element of the device (for example, the acquisition unit 241 and/or the reception processing unit 243, or the like) is also included in the technology of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A device including:

a transmission processing unit configured to set each of transmission signal sequences of a plurality of power layers that are to be multiplexed using power allocation as a target and apply at least one of a scrambler using a scramble pattern and an interleaver using an interleave pattern corresponding to information regarding the power allocation.

(2)

The device according to (1), in which the information regarding the power allocation includes a target power layer index.

(3)

The device according to (2), in which the information regarding the power allocation includes information indicating a pattern of power that is to be allocated to each of the plurality of power layers.

(4)

The device according to any one of (1) to (3), in which the information regarding the power allocation includes information indicating a value of power that is to be allocated to a target power layer.

(5)

The device according to any one of (1) to (4), in which the information regarding the power allocation includes a channel quality indicator (CQI) of a target user.

(6)

The device according to any one of (1) to (5), in which the transmission processing unit applies at least one of a scrambler using a scramble pattern and an interleaver using an interleave pattern corresponding to control information regarding transmission and reception of the transmission signal sequences.

(7)

The device according to (6), in which the control information regarding transmission and reception includes information indicating the number of retransmissions of the transmission signal sequence.

(8)

The device according to (6) or (7), in which the control information regarding transmission and reception includes information indicating a transmission mode.

(9)

The device according to any one of (6) to (8), in which the control information regarding transmission and reception includes information indicating a downlink control information (DCI) format.

(10)

The device according to any one of (6) to (9), in which the control information regarding transmission and reception includes information indicating a modulation and coding scheme (MCS).

(11)

The device according to any one of (6) to (10), in which the transmission signal sequences of the plurality of power layers that are to be multiplexed using the power allocation are transmission signal sequences to users having the identical control information regarding transmission and reception.

(12)

The device according to any one of (1) to (11), in which, for each of a plurality of spatial layers that are to be multiplexed using spatial allocation, the transmission processing unit sets each of the transmission signal sequences of the plurality of power layers that are to be multiplexed using the power allocation in the allocated spatial layers, as a target.

(13)

The device according to any one of (1) to (12), further including:

a notification unit configured to notify a user who is a destination of the transmission signal sequences of the plurality of power layers, of the information regarding the power allocation.

(14)

The device according to (13), in which, as the information regarding the power allocation, the notification unit notifies of a power layer index of the transmission signal sequence to a user who is a notification destination.

(15)

The device according to (14), in which, as the information regarding the power allocation, the notification unit notifies of the total number of the plurality of power layers.

(16)

The device according to (14) or (15), in which, as the information regarding the power allocation, the notification unit notifies of information indicating a relation between an increase or decrease direction of a power layer index and an increase or decrease direction of power that is to be allocated.

(17)

The device according to any one of (14) to (16), in which, as the information regarding the power allocation, the notification unit notifies of an index serving as a starting point of an increase or decrease direction of power that is to be allocated.

(18)

The device according to any one of (14) to (17), in which, as the information regarding the power allocation, the notification unit notifies of information indicating a pattern of power that is to be allocated to each of the plurality of power layers.

(19)

The device according to any one of (13) to (18), in which, as the information regarding the power allocation, the notification unit notifies of information indicating a value of power that is to be allocated to each of the plurality of power layers.

(20)

The device according to any one of (13) to (19), in which, as the information regarding the power allocation, the notification unit notifies of a CQI of one or more other users who are destinations of the transmission signal sequences of the plurality of power layers.

(21)

The device according to any one of (13) to (20), in which the notification unit notifies as radio resource control (RRC) signaling or a part of an RRC message.

(22)

The device according to any one of (13) to (21), in which the notification unit notifies as a part of system information.

(23)

The device according to any one of (13) to (22), in which the notification unit notifies as a part of DCI.

(24)

The device according to any one of (13) to (23), in which the notification unit notifies of control information regarding transmission and reception of each of the transmission signal sequences of the plurality of power layers.

(25)

A device including:

an acquisition unit configured to acquire information regarding power allocation of a plurality of power layers that are to be multiplexed using power allocation; and a reception processing unit configured to perform interference cancellation using at least one of a descrambler using a scramble pattern and a deinterleaver using an interleave pattern corresponding to the information regarding the power allocation acquired by the acquisition unit.

(26)

The device according to (25), in which the acquisition unit acquires control information regarding transmission and reception of transmission signal sequences transmitted in the plurality of power layers, and the reception processing unit uses at least one of the descrambler using the scramble pattern and the deinterleaver using the interleave pattern corresponding to the control information regarding transmission and reception.

(27)
The device according to (25) or (26),
in which the acquisition unit performs acquisition from at least one of RRC signaling or an RRC message and system information or DCI.

(28)
A method including:
setting each of transmission signal sequences of a plurality of power layers that are to be multiplexed using power allocation as a target, and applying at least one of a scrambler using a scramble pattern and an interleaver using an interleave pattern corresponding to information regarding the power allocation, by a processor.

(29)
The method according to (28),
in which the information regarding the power allocation includes a target power layer index.

(30)
The method according to (29),
in which the information regarding the power allocation includes information indicating a pattern of power that is to be allocated to each of the plurality of power layers.

(31)
The method according to any one of (28) to (30),
in which the information regarding the power allocation includes information indicating a value of power that is to be allocated to a target power layer.

(32)
The method according to any one of (28) to (31),
in which the information regarding the power allocation includes a channel quality indicator (CQI) of a target user.

(33)
The method according to any one of (28) to (32), including
applying at least one of a scrambler using a scramble pattern and an interleaver using an interleave pattern corresponding to control information regarding transmission and reception of the transmission signal sequences.

(34)
The method according to (33),
in which the control information regarding transmission and reception includes information indicating the number of retransmissions of the transmission signal sequence.

(35)
The method according to (33) or (34),
in which the control information regarding transmission and reception includes information indicating a transmission mode.

(36)
The method according to any one of (33) to (35),
in which the control information regarding transmission and reception includes information indicating a downlink control information (DCI) format.

(37)
The method according to any one of (33) to (36),
in which the control information regarding transmission and reception includes information indicating a modulation and coding scheme (MCS).

(38)
The method according to any one of (33) to (37),
in which the transmission signal sequences of the plurality of power layers that are to be multiplexed using the power allocation are transmission signal sequences to users having the identical control information regarding transmission and reception.

(39)
The method according to any one of (28) to (38), including
setting each of the transmission signal sequences of the plurality of power layers that are to be multiplexed using the power allocation in the allocated spatial layers, as a target, for each of a plurality of spatial layers that are to be multiplexed using spatial allocation.

(40)
The method according to any one of (28) to (39), including
notifying a user who is a destination of the transmission signal sequences of the plurality of power layers, of the information regarding the power allocation.

(41)
The method according to (40), including
notifying of a power layer index of the transmission signal sequence to a user who is a notification destination, as the information regarding the power allocation.

(42)
The method according to (41), including
notifying of the total number of the plurality of power layers, as the information regarding the power allocation.

(43)
The method according to (41) or (42),
notifying of information indicating a relation between an increase or decrease direction of a power layer index and an increase or decrease direction of power that is to be allocated, as the information regarding the power allocation.

(44)
The method according to any one of (41) to (43), including
notifying of an index serving as a starting point of an increase or decrease direction of power that is to be allocated, as the information regarding the power allocation.

(45)
The method according to any one of (41) to (44),
notifying of information indicating a pattern of power that is to be allocated to each of the plurality of power layers, as the information regarding the power allocation.

(46)
The method according to any one of (40) to (45), including
notifying of information indicating a value of power that is to be allocated to each of the plurality of power layers, as the information regarding the power allocation.

(47)
The method according to any one of (40) to (46), including
notifying of a CQI of one or more other users who are destinations of the transmission signal sequences of the plurality of power layers, as the information regarding the power allocation.

(48)
The method according to any one of (40) to (47), including
issuing a notification as radio resource control (RRC) signaling or a part of an RRC message.

(49)
The method according to any one of (40) to (48), including
issuing a notification as a part of system information.

(50)
The method according to any one of (40) to (49), including
issuing a notification as a part of a DCI.

(51)

The method according to any one of (40) to (50), including notifying of control information regarding transmission and reception of each of the transmission signal sequences of the plurality of power layers.

(52)

A method including:

acquiring information regarding power allocation of a plurality of power layers that are to be multiplexed using power allocation; and performing, by a processor, interference cancellation using at least one of a descrambler using a scramble pattern and a deinterleaver using an interleave pattern corresponding to the acquired information regarding the power allocation.

(53)

The method according to (52), including:

acquiring control information regarding transmission and reception of transmission signal sequences transmitted in the plurality of power layers; and using at least one of the descrambler using the scramble pattern and the deinterleaver using the interleave pattern corresponding to the control information regarding transmission and reception.

(54)

The method according to (52) or (53), including performing acquisition from at least one of RRC signaling or an RRC message and system information or DCI.

(55)

A program causing a computer to function as:

a transmission processing unit configured to set each of transmission signal sequences of a plurality of power layers that are to be multiplexed using power allocation as a target and apply at least one of a scrambler using a scramble pattern and an interleaver using an interleave pattern corresponding to information regarding the power allocation.

(56)

A program causing a computer to function as:

an acquisition unit configured to acquire information regarding power allocation of a plurality of power layers that are to be multiplexed using power allocation; and a reception processing unit configured to perform interference cancellation using at least one of a descrambler using a scramble pattern and a deinterleaver using an interleave pattern corresponding to the information regarding the power allocation acquired by the acquisition unit.

REFERENCE SIGNS LIST 1 system
100 base station
101 cell
110 antenna unit
120 radio communication unit
130 network communication unit
140 storage unit
150 processing unit
151 transmission processing unit
153 notification unit
200 terminal device
210 antenna unit
220 radio communication unit
230 storage unit
240 processing unit
241 acquisition unit
243 reception processing unit

The invention claimed is:

1. A device comprising:

transmission processing circuitry configured to set each of transmission signal sequences of a plurality of power layers that are to be multiplexed using power allocation as a target and apply at least one of a scrambler using a scramble pattern and an interleaver using an interleave pattern corresponding to information regarding the power allocation;

wherein the transmission processing circuitry applies at least one of a scrambler using a scramble pattern and an interleaver using an interleave pattern corresponding to control information regarding transmission and reception of the transmission signal sequences;

wherein the transmission signal sequences of the plurality of power layers that are to be multiplexed using the power allocation are transmission signal sequences to users having the identical control information regarding transmission and reception.

2. The device according to claim 1,
wherein the information regarding the power allocation includes a target power layer index.

3. The device according to claim 2,
wherein the information regarding the power allocation includes information indicating a pattern of power that is to be allocated to each of the plurality of power layers.

4. The device according to claim 1,
wherein the information regarding the power allocation includes information indicating a value of power that is to be allocated to a target power layer.

5. The device according to claim 1,
wherein the information regarding the power allocation includes a channel quality indicator (CQI) of a target user.

6. The device according to claim 1,
wherein the control information regarding transmission and reception includes information indicating the number of retransmissions of the transmission signal sequence.

7. The device according to claim 1,
wherein the control information regarding transmission and reception includes information indicating a transmission mode.

8. The device according to claim 1,
wherein the control information regarding transmission and reception includes information indicating a downlink control information (DCI) format.

9. The device according to claim 1,
wherein the control information regarding transmission and reception includes information indicating a modulation and coding scheme (MCS).

10. The device according to claim 1,
wherein, for each of a plurality of spatial layers that are to be multiplexed using spatial allocation, the transmission processing circuitry sets each of the transmission signal sequences of the plurality of power layers that are to be multiplexed using the power allocation in the allocated spatial layers, as a target.

11. A device comprising:

transmission processing circuitry configured to set each of transmission signal sequences of a plurality of power layers that are to be multiplexed using power allocation as a target and apply at least one of a scrambler using a scramble pattern and an interleaver using an interleave pattern corresponding to information regarding the power allocation;

notification circuitry configured to notify a user who is a destination of the transmission signal sequences of the plurality of power layers, of the information regarding the power allocation;

wherein, as the information regarding the power allocation, the notification circuitry notifies of a power layer index of the transmission signal sequence to a user who is a notification destination;

wherein, as the information regarding the power allocation, the notification circuitry notifies of the total number of the plurality of power layers.

12. The device according to claim 11,
wherein, as the information regarding the power allocation, the notification circuitry notifies of information indicating a relation between an increase or decrease direction of a power layer index and an increase or decrease direction of power that is to be allocated.

13. The device according to claim 11,
wherein, as the information regarding the power allocation, the notification unit circuitry notifies of an index serving as a starting point of an increase or decrease direction of power that is to be allocated.

14. The device according to claim 11,
wherein, as the information regarding the power allocation, the notification circuitry notifies of information indicating a pattern of power that is to be allocated to each of the plurality of power layers.

15. The device according to claim 11,
wherein, as the information regarding the power allocation, the notification circuitry notifies of information indicating a value of power that is to be allocated to each of the plurality of power layers.

16. The device according to claim 11,
wherein, as the information regarding the power allocation, the notification circuitry notifies of a CQI of one or more other users who are destinations of the transmission signal sequences of the plurality of power layers.

17. The device according to claim 11,
wherein the notification circuitry notifies of control information regarding transmission and reception of each of the transmission signal sequences of the plurality of power layers.

18. A device comprising:
acquisition circuitry configured to acquire information regarding power allocation of a plurality of power layers that were multiplexed using power allocation wherein each of transmission signal sequences of the plurality of power layers that were multiplexed using power allocation were set as a target and were applied at least one of a scrambler using a scramble pattern and an interleaver using an interleave pattern corresponding to information regarding the power allocation; and
reception processing circuitry configured to perform interference cancellation using at least one of a descrambler using a scramble pattern and a deinterleaver using an interleave pattern corresponding to control information regarding transmission and reception of the transmission signal sequences, the control information regarding the power allocation acquired by the acquisition circuitry;
wherein the transmission signal sequences of the plurality of power layers were multiplexed using the power allocation are transmission signal sequences to users having the identical control information regarding transmission and reception.

19. A device comprising:
acquisition circuitry configured to acquire information regarding power allocation of a plurality of power layers that were multiplexed using power allocation wherein each of transmission signal sequences of the plurality of power layers that were multiplexed using power allocation were set as a target and were applied at least one of a scrambler using a scramble pattern and an interleaver using an interleave pattern corresponding to information regarding the power allocation; and
reception processing circuitry configured to detect the information regarding the power allocation when the device is a destination of the transmission signal sequences of the plurality of power layers;
wherein the information regarding the power allocation includes a power layer index of the transmission signal sequence;
wherein the information regarding the power allocation includes a total number of the plurality of power layers.

* * * * *